United States Patent
Kono

(10) Patent No.: US 10,564,952 B2
(45) Date of Patent: Feb. 18, 2020

(54) METHOD AND APPARATUS TO DEPLOY APPLICATIONS ON PROPER IT RESOURCES BASED ON FREQUENCY AND AMOUNT OF CHANGES OF APPLICATIONS

(71) Applicant: Hitachi, Ltd., Chiyoda-ku, Tokyo (JP)

(72) Inventor: Yasutaka Kono, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/073,291

(22) PCT Filed: Jun. 7, 2016

(86) PCT No.: PCT/US2016/036246
§ 371 (c)(1),
(2) Date: Jul. 26, 2018

(87) PCT Pub. No.: WO2017/213634
PCT Pub. Date: Dec. 14, 2017

(65) Prior Publication Data
US 2019/0050214 A1 Feb. 14, 2019

(51) Int. Cl.
*G06F 8/61* (2018.01)
*G06F 8/71* (2018.01)
*G06F 9/445* (2018.01)
*G06F 9/50* (2006.01)
*G06F 11/07* (2006.01)
*G06F 11/14* (2006.01)

(52) U.S. Cl.
CPC ............... *G06F 8/61* (2013.01); *G06F 8/71* (2013.01); *G06F 9/44505* (2013.01); *G06F 9/5022* (2013.01); *G06F 9/5077* (2013.01); *G06F 11/0757* (2013.01); *G06F 11/142* (2013.01); *G06F 11/1433* (2013.01)

(58) Field of Classification Search
CPC .......... G06F 8/61; G06F 8/71; G06F 9/44505; G06F 9/5022; G06F 9/5077; G06F 11/0757; G06F 11/142; G06F 11/1433
USPC ............................................ 717/174
See application file for complete search history.

(56) References Cited

U.S. PATENT DOCUMENTS

| 8,286,199 | B1 | 10/2012 | Pulaski et al. |
| 9,578,063 | B1* | 2/2017 | Iyer et al. ............ G06F 8/61 |
| 2007/0061191 | A1 | 3/2007 | Mehrotra et al. |
| 2008/0059610 | A1 | 3/2008 | Lin et al. |
| 2015/0089659 | A1 | 3/2015 | Beckman et al. |
| 2015/0378765 | A1* | 12/2015 | Singh et al. ............ G06F 8/61 718/1 |
| 2017/0270444 | A1 | 9/2017 | Aerdts et al. |

FOREIGN PATENT DOCUMENTS

WO   2016/036394 A1   3/2016

* cited by examiner

*Primary Examiner* — Wei Y Zhen
*Assistant Examiner* — Mohammed N Huda
(74) *Attorney, Agent, or Firm* — Procopio, Cory, Hargreaves & Savitch LLP

(57) ABSTRACT

Methods and apparatuses described herein are directed to a management program that manages IT infrastructures and deploys applications on them while taking the maturity level of the applications into consideration. Example implementations also involve a management program that modifies configurations of IT resources while considering the maturity level and usage frequency of the application during application resizing.

13 Claims, 28 Drawing Sheets

2520

| | Storage ID | Volume ID | Capacity (TB) | Pool ID | Reserved Flag | Media Type |
|---|---|---|---|---|---|---|
| 252A | 01 | 01 | 10 | Pool-01 | 1 | SSD |
| 252B | 01 | 02 | 20 | Pool-04 | 1 | SSD |
| 252C | 02 | 01 | 5 | Pool-01 | 1 | SATA HDD |
| 252D | 02 | 02 | 4 | Pool-01 | 0 | SSD |
| 252E | 02 | 03 | 10 | Pool-02 | 1 | SAS HDD |
| | : | : | : | : | : | : |

Columns: 2521, 2522, 2523, 2524, 2525, 2526

FIG. 6

|  | ID | CPU (# of core, Type) | Memory | Port (Gbps) |
|---|---|---|---|---|
| 253A | 01 | 12 Core, Normal | 32GB | A(4), B(4) |
| 253B | 02 | 32 Core, High | 256 GB | A(8), B(8) |
| 253C | 03 | 24 Core, High | 256 GB | A(8) |
| 253D | 04 | 24 Core, High | 128 GB | A(16), B(16) |
|  | : | : | : | : |

FIG. 7

|  | ID | Physical Server ID | CPU (# of core) | Memory | Port (Gbps) | Reserved Flag | Storage Capacity |
|---|---|---|---|---|---|---|---|
| 254A | 01 | 01 | 2 Core | 4 GB | A(4) | 1 | 500GB |
| 254B | 02 | 01 | 8 Core | 32 GB | B(8) | 1 | 1TB |
| 254C | 03 | 02 | 16 Core | 8 GB | A(8) | 0 | 300GB |
| 254D | 04 | 02 | 16 Core | 8 GB | A(16) | 1 | 200GB |
| | : | : | : | : | : | : | : |

FIG. 8

| | Application ID 2551 | Application Name 2552 | Template ID 2553 | Virtual Server ID 2554 | Virtual Server Name 2555 | Virtual Server Port 2556 | Storage ID 2557 | Storage Port ID 2558 | Volume ID 2559 |
|---|---|---|---|---|---|---|---|---|---|
| 255A | 1 | mobile-app-A | 1 | 01 | mobile-A | A | 01 | A | 011 |
| 255B | 2 | Web-C | 4 | 03 | Web DB | A | 02 | B | 052 |
| | | | | | | A | 01 | A | 055 |
| 255C | 3 | OLAP-E | 3 | 04 | OLAP-E-1 | C | 03 | D | 063 |
| | | | | 05 | OLAP-E-2 | B | 02 | C | 105 |
| 255D | 4 | Web-B | 4 | 06 | WebLogic | D | 01 | A | 120 |
| | | | | 07 | WebFront-1 | B | 03 | A | 050 |
| | | | | | | B | 03 | B | 051 |
| 255E | 5 | DEV-C | 6 | 08 | Dev-C-1 | C | 04 | C | 023 |
| | | | | 09 | Dev-C-2 | A | 05 | D | 225 |
| 255F | 6 | Web-A | 4 | 10 | WebFront-2 | C | 05 | E | 221 |
| 255G | 7 | Mail-A | 5 | 11 | Mail-A-1 | D | 04 | A | 235 |
| | | | | 12 | Mail-A-2 | E | 06 | A | 248 |
| | | | | | | A | 04 | B | 249 |
| | | | | 13 | Mail-A-3 | A | 03 | C | 101 |
| | | | | 14 | Mail-A-4 | B | 04 | B | 111 |
| | : | : | : | : | : | : | : | : | : |

| Server ID | Physical Server Flag | History ID | CPU Usage | | | Memory Usage | Disk Usage | Port Usage |
|---|---|---|---|---|---|---|---|---|
| | | | CPU 0 | ... | CPU 31 | | | |
| 01 | YES | 0 | 14% | ... | 22% | 24% | 50% | 30% |
| | | 1 | 15% | ... | 18% | 30% | 70% | 34% |
| | | 2 | 14% | ... | 19% | 25% | 66% | 40% |
| | | : | : | ... | : | : | : | : |
| 02 | NO | 0 | 20% | ... | 30% | 50% | 10% | 20% |
| | | 1 | 21% | ... | 10% | 43% | 20% | 22% |
| | | 2 | 25% | ... | 15% | 30% | 14% | 30% |
| | | : | : | ... | : | : | : | : |
| : | : | : | : | ... | : | : | : | : |

| Resource Type | Resource ID | Application Maturity |
|---|---|---|
| Storage Array | 01 | High |
| Storage Array | 02 | High |
| Storage Array | 03 | High |
| Physical Server | 01 | Low |
| Physical Server | 02 | Low / High |
| Physical Server | 03 | Low / High |
| Physical Server | 04 | Low |
| : | : | : |

2581 — Resource Type
2582 — Resource ID
2583 — Application Maturity

258A — Storage Array 01
258B — Storage Array 02
258C — Storage Array 03
258D — Physical Server 01
258E — Physical Server 02
258F — Physical Server 03
258G — Physical Server 04

FIG. 12

| Application Maturity | Timeout |
|---|---|
| Low | 60 |
| High | 120 |

FIG. 13

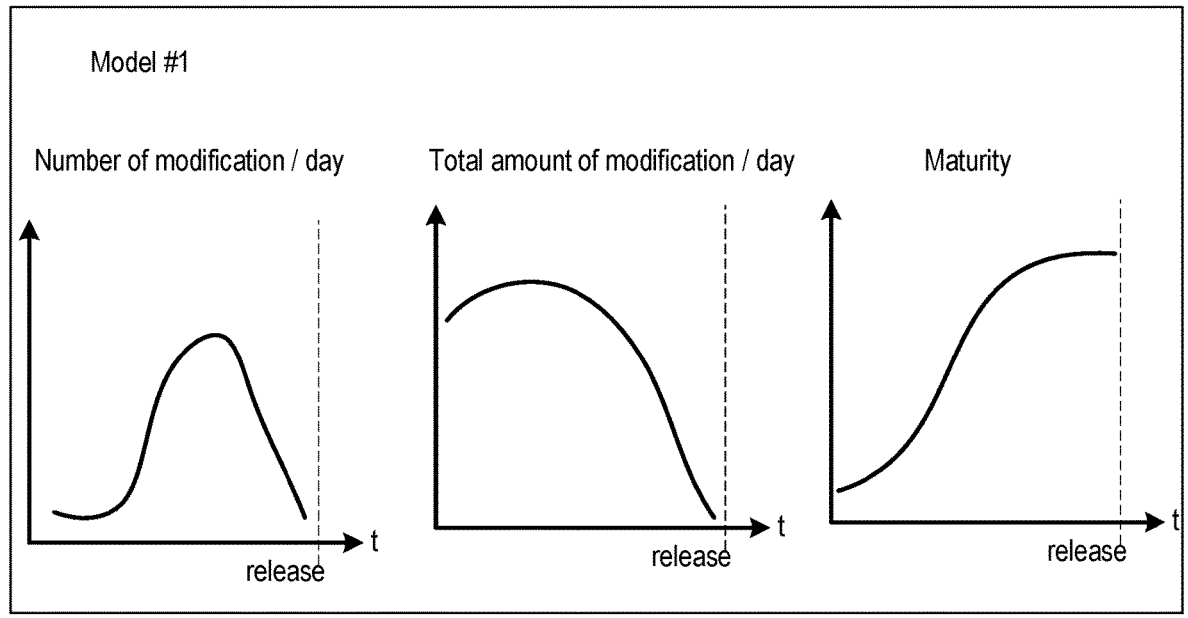
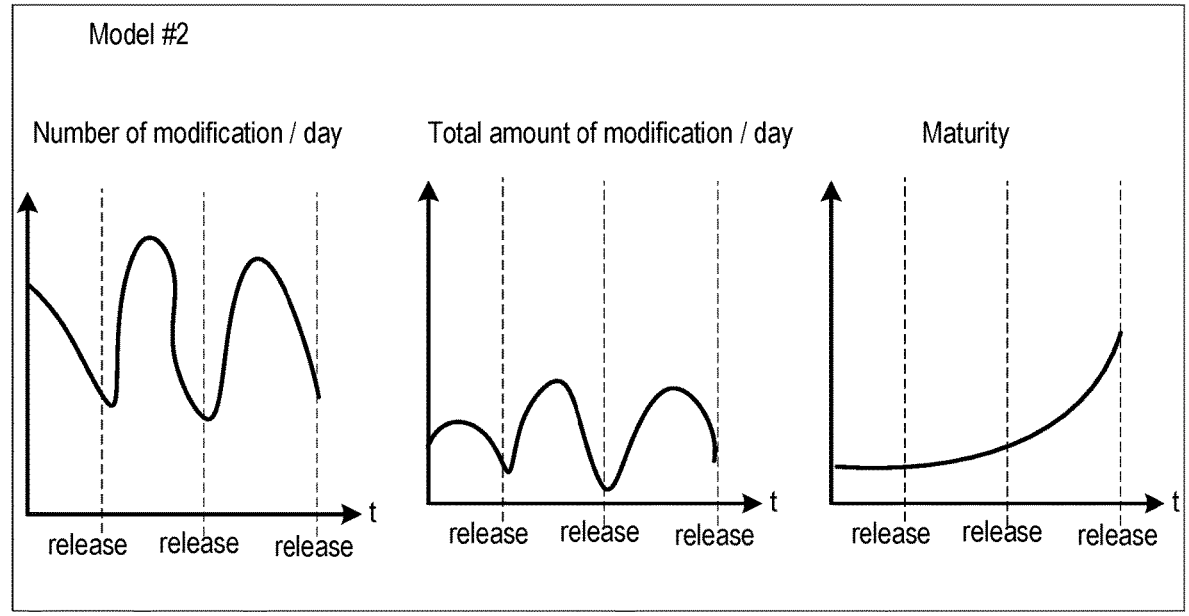
FIG. 17

| | Resource Type | Resource ID | Application Maturity | Usage Frequency |
|---|---|---|---|---|
| 258A' | Storage Array | 01 | High | High |
| 258B' | Storage Array | 02 | High | High |
| 258C' | Storage Array | 03 | High | Low / High |
| 258D' | Physical Server | 01 | Low | Low |
| 258E' | Physical Server | 02 | Low / High | Low |
| 258F' | Physical Server | 03 | Low / High | Low / High |
| 258G' | Physical Server | 04 | Low | Low |
| | : | : | : | : |

|  | Application Maturity | Usage Frequency | Timeout |
|---|---|---|---|
| 259A' | Low | Low | 60 |
| 259B' | Low | High | 90 |
| 259C' | High | Low | 90 |
| 259D' | High | High | 120 |

FIG. 23

METHOD AND APPARATUS TO DEPLOY APPLICATIONS ON PROPER IT RESOURCES BASED ON FREQUENCY AND AMOUNT OF CHANGES OF APPLICATIONS

BACKGROUND

Field

The present disclosure is generally directed to information technology (IT) systems, and more specifically, to deployment of applications on appropriate IT resources.

Related Art

In related art implementations there are methods and apparatus for instant host configuration. In such related art implementations, there is a system includes a plurality of instance hosts configurable for resource instances of a network-accessible service, and control servers to manage remote configuration of the instance hosts. In such example implementations, a selected control server transmits, to a selected instance host, a sequence of one or more commands in response to an instance configuration request from a client. The selected instance host instantiates a remote command executor. The remote command executor initiates configuration operations corresponding to the command sequence, and terminates. The selected control server provides a response to the instance configuration request, based at least in part on results of the operations initiated by the executor. An example of such a related art implementations is described in US Patent Publication No. 2014/0207918 A1, herein incorporated by reference in its entirety for all purposes.

SUMMARY

The related art implementations fail to consider application maturity and usage frequency of applications when IT infrastructures and resources are deployed. Example implementations described herein are directed to providing a management program that manages IT infrastructures and deploys applications on them with considering the maturity of the application. Further, example implementations involve a management program that modifies configurations of IT resources to resize applications with considering maturity and usage frequency of the application.

Aspects of the present disclosure can include a management computer configured to manage IT resources, the management computer communicatively coupled to an application development repository. The management computer can involve a processor, configured to determine, from a request for deploying an application in the application development repository, an application to be deployed on the IT resources; determine a maturity level of the application to be deployed, based on information from the application development repository; generate one or more configurations based on the IT resources for the application to be deployed, the one or more configurations generated according to the maturity level; allocate the IT resources specified for the one or more configurations for the application to be deployed; and deploy the application to be deployed on the allocated IT resources.

Aspects of the present disclosure can include a non-transitory computer readable medium storing instructions for a management computer configured to manage information technology (IT) resources, the management computer communicatively coupled to an application development repository. The instructions can include determining, from a request for deploying an application in the application development repository, an application to be deployed on the IT resources; determining a maturity level of the application to be deployed, based on information from the application development repository; generating one or more configurations based on the IT resources for the application to be deployed, the one or more configurations generated according to the maturity level; allocating the IT resources specified for the one or more configurations for the application to be deployed; and deploying the application to be deployed on the allocated IT resources.

Aspects of the present disclosure can include a method for a management computer configured to manage information technology (IT) resources, the management computer communicatively coupled to an application development repository. The method can include determining, from a request for deploying an application in the application development repository, an application to be deployed on the IT resources; determining a maturity level of the application to be deployed, based on information from the application development repository; generating one or more configurations based on the IT resources for the application to be deployed, the one or more configurations generated according to the maturity level; allocating the IT resources specified for the one or more configurations for the application to be deployed; and deploying the application to be deployed on the allocated IT resources.

BRIEF DESCRIPTION OF DRAWINGS

FIG. 6 illustrates a storage volume table, in accordance with an example implementation.

FIG. 7 illustrates a physical server table, in accordance with an example implementation.

FIG. 8 illustrates a virtual server table, in accordance with an example implementation.

FIG. 9 illustrates a mapping table, in accordance with an example implementation.

FIG. 11 illustrates the server performance table, in accordance with an example implementation.

FIG. 12 illustrates a resource group table, in accordance with an example implementation.

FIG. 13 illustrates a timeout definition table, in accordance with an example implementation.

FIG. 17 illustrates application maturity models, in accordance with an example implementation.

FIG. 22 illustrates a resource group table, in accordance with an example implementation.

FIG. 23 illustrates a timeout definition table, in accordance with an example implementation.

DETAILED DESCRIPTION

Figure 1A:
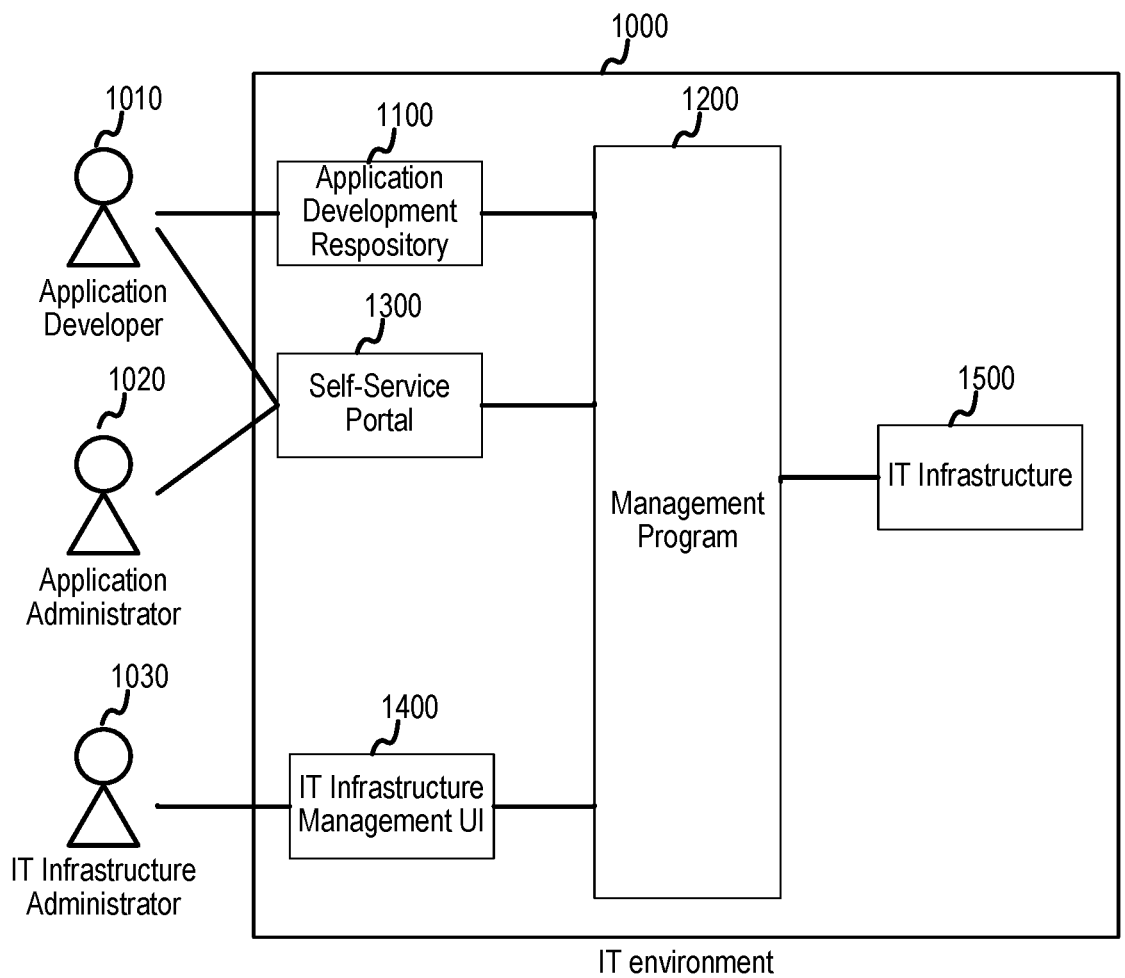
FIG. 1A illustrates an example of a logical configuration of the system in which the method and apparatus of the embodiments may be applied.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

First Example Embodiment

In a first example embodiment, there is a management program that manages IT infrastructures and deploys applications on the infrastructure while taking the maturity of the applications into consideration.

FIG. 1A illustrates an example of a logical configuration of the system in which the method and apparatus of the embodiments may be applied. IT environment 1000 can include of management program 1200, Application Development Repository 1100, Self-Service Portal 1300, IT Infrastructure Management UI 1400, and IT infrastructure 1500. Application developer 1010 develops applications and stores elements of the applications (e.g. source codes, configuration files and other documents or images) into Application Development Repository 1100. Application developer 1010 and Application administrator 1020 accesses the IT environment 1000 via Self-Service Portal 1300. IT infrastructure administrator 1030 accesses the IT environment 1000 via IT infrastructure management UI 1400.

Figure 1B:
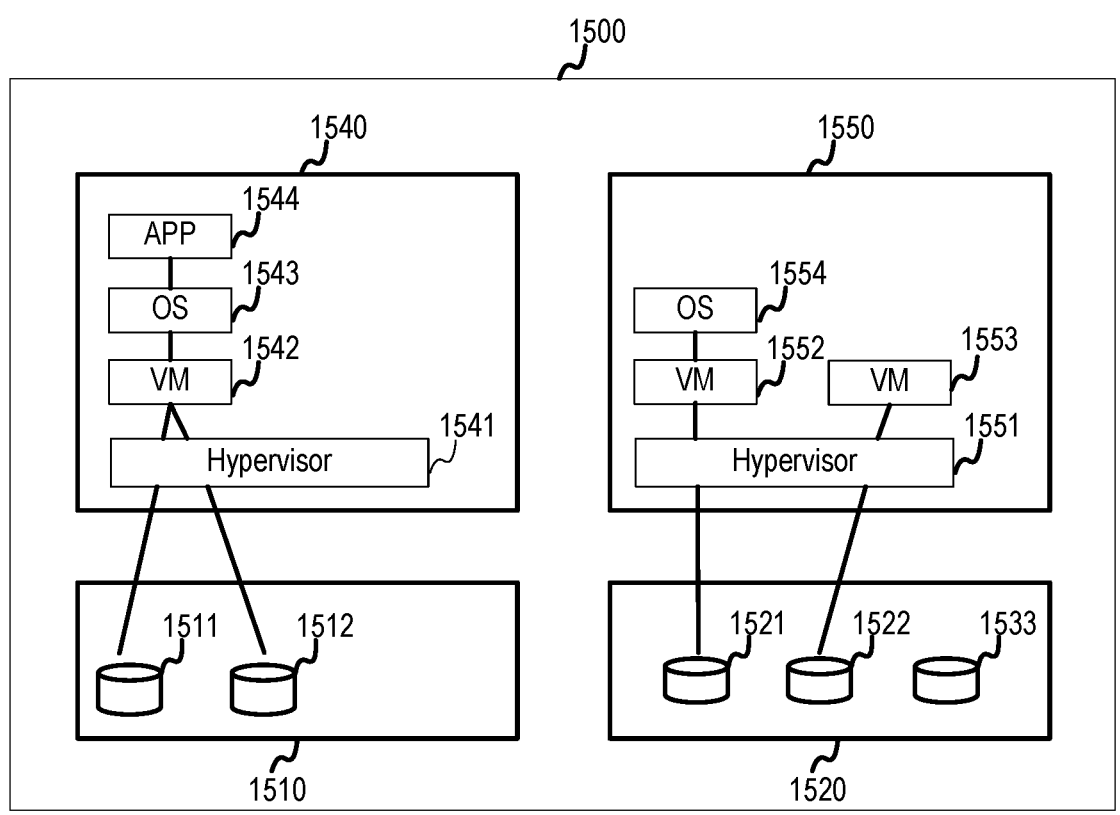
FIG. 1B illustrates an example logical configuration of the IT infrastructure.

FIG. 1B illustrates an example logical configuration of the IT infrastructure 1500. IT infrastructure 1500 includes one or more servers and/or storage arrays. In the example of FIG. 1B, there are two servers (1540 and 1550) and two storage arrays (1510 and 1520), however the present disclosure is not limited thereto and can involve any number of servers and storage arrays according to the desired implementation. Application 1544, OS (Operating System) 1543 and VM (Virtual Machine) 1542 are run on Hypervisor 1541. The hypervisor 1541 is run on Server 1540. OS 1554, VM 1552 and VM 1553 are run on Hypervisor 1551. The hypervisor 1551 is run on Server 1550. Application 1544 uses Storage Volume 1511 and Storage Volume 1512 of Storage Array 1510. Storage Volume 1521 of Storage Array 1520 is allocated to VM 1552 and OS 1554, but in the example of FIG. 1B no applications on OS 1554 are using the volume. Storage Volume 1522 of Storage Array 1522 is allocated to VM 1553.

Figure 1C:
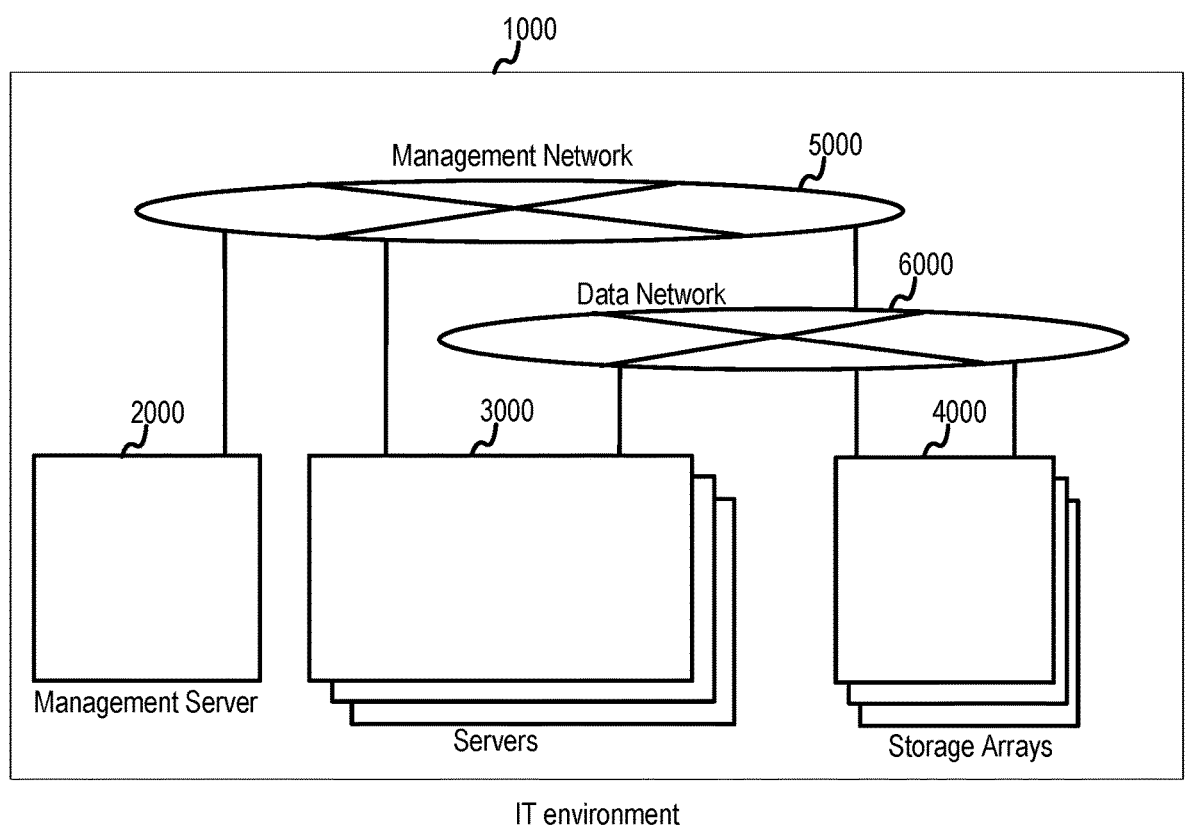
FIG. 1C illustrates an example physical configuration of the IT environment for the first example embodiment.

FIG. 1C illustrates an example physical configuration of the IT environment for the first example embodiment. IT environment 1000 includes management computer 2000, servers 3000, storage arrays 4000, management network 5000 and data network 6000. Servers 3000 and storage arrays 4000 are connected via data network 6000. This network can be LAN (Local Area Network) but other networks may also be utilized depending on the desired implementation. Management computer 2000, servers 3000 and storage arrays 4000 are connected via management network 5000, which can also be implemented as LAN or any other desired network implementation. Though management network 5000 and data network 6000 are separated in this example embodiment, they can be replaced with a single converged network depending on the desired implementation. In this example embodiment, management computer 2000 and servers 3000 are separated, but can also be implemented in other ways according to the desired implementation. For example, any server can host a management program. Further, servers 3000 and storage arrays 4000 are separated in this example embodiment, however servers and storages arrays can be converged into one system, or other desired implementations may also be utilized.

Figure 2:
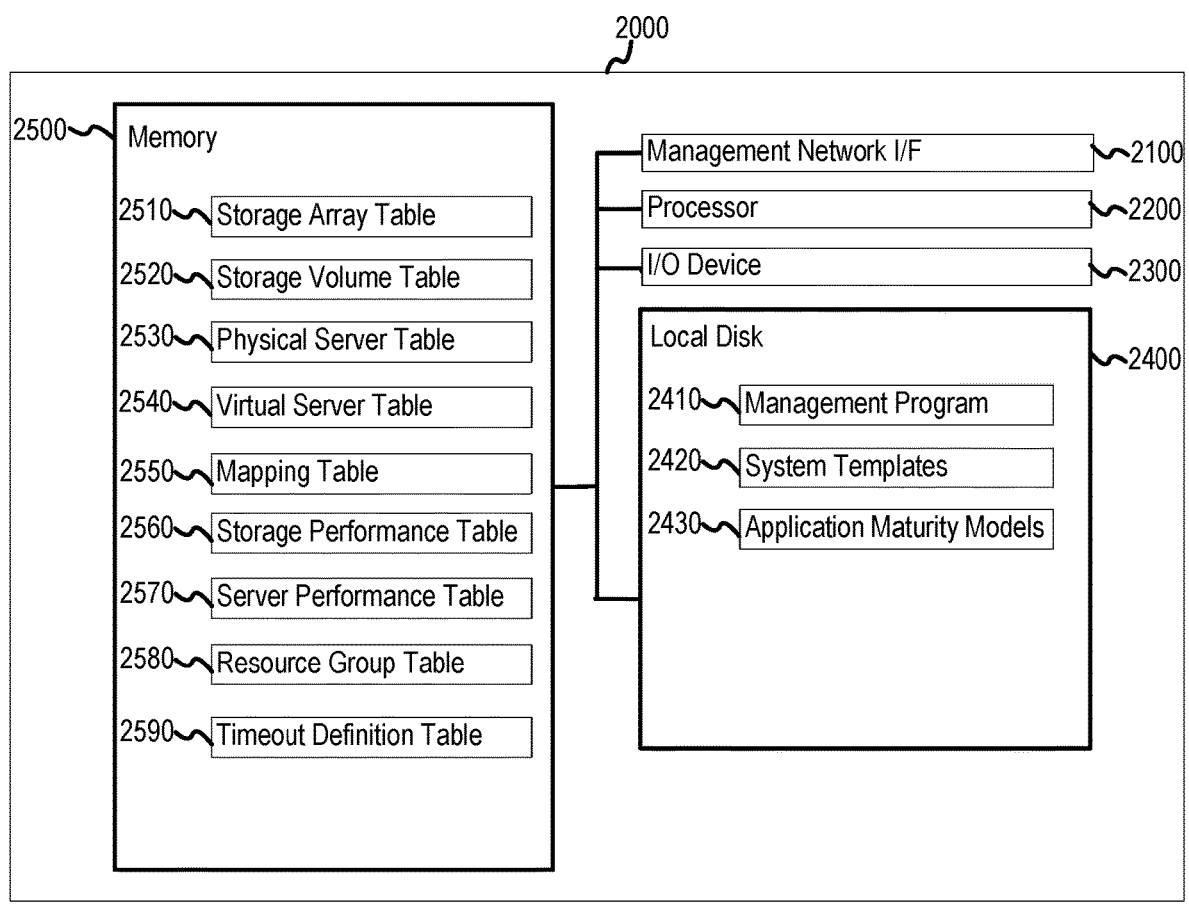
FIG. 2 illustrates a configuration of management computer, in accordance with an example implementation.

FIG. 2 illustrates a configuration of management computer, in accordance with an example implementation. Management Network Interface 2100 is an interface utilized to connect the management computer 2000 to the management network 5000. Input and output device 2300 is a user interface such as a monitor, a keyboard and a mouse. Local Disk 2400 contains management program 2410, system templates 2420 and application maturity models 2430. Management program 2410 is loaded to Memory 2500 and executed by processor 2200, which can be in the form of one or more physical central processing units (CPUs). Details of the procedure of the management program 2410 are provided throughout the present disclosure. Management program 2410 can be the same entity as management program 1200 in FIG. 1A.

System templates 2420 and application maturity models 2430 are loaded to Memory 2500 and used by the management program 2410. These templates and models are disclosed below. Memory 2500 contains storage array table 2510, storage volume table 2520, physical server table 2530, virtual server table 2540, mapping table 2550, storage performance table 2560, server performance table 2570, resource group table 2580 and timeout definition table 2590, further details of which are provided throughout the present disclosure.

In example implementations, the management computer 2000 is configured to manage IT resources such as the servers 3000 and the storage arrays/storage systems 4000 and is communicatively coupled through management network 5000 to an application development repository 1100, which can be implemented in the form of a database connected to management network 5000.

Figure 15:
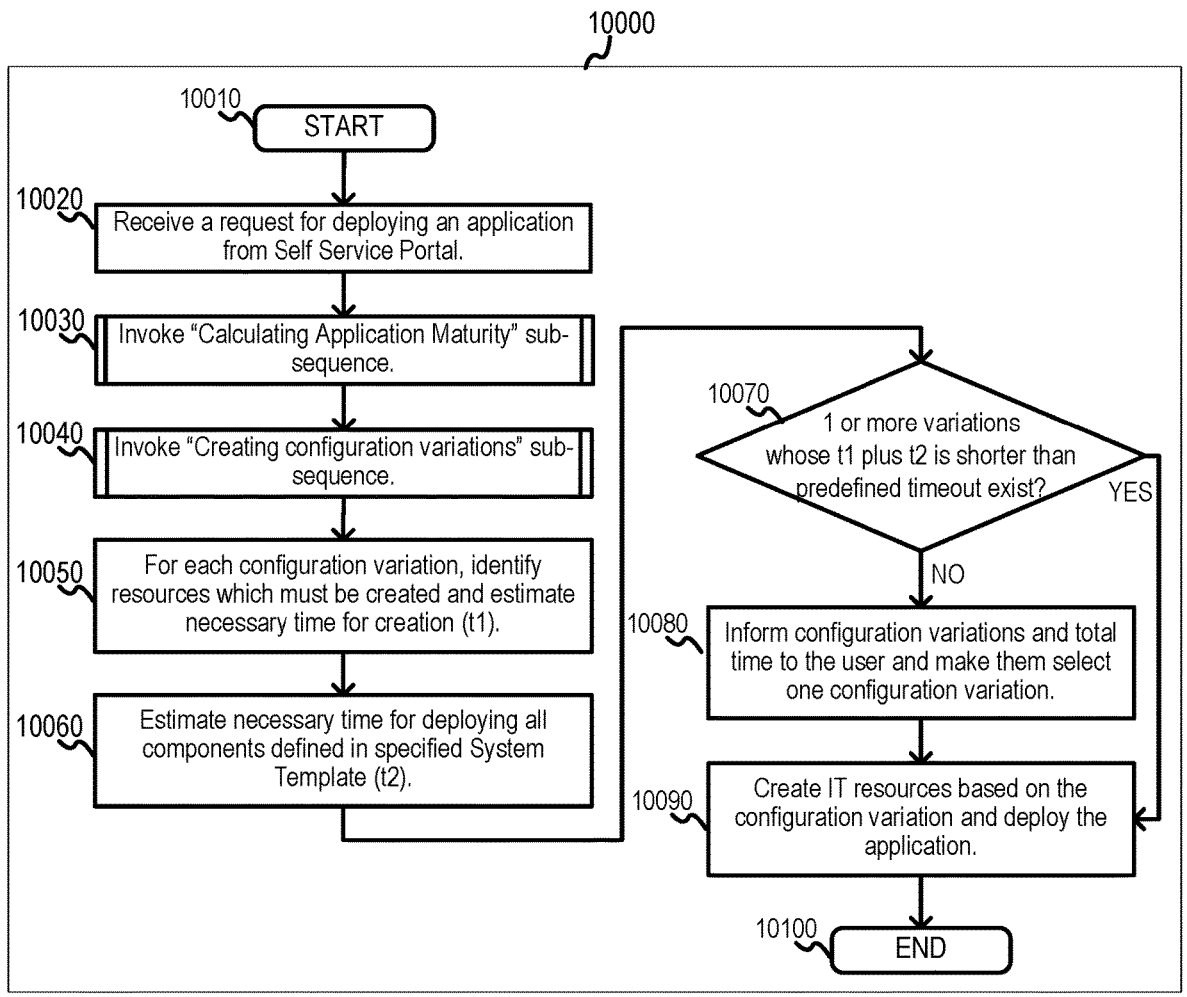
FIG. 15 shows a flowchart of management program for deploying an application, in accordance with an example implementation.

Management program 2410 may be in the form of instructions that can be loaded into the processor 2200 such that the processor 2200 is configured to determine, from a request for deploying an application in the application development repository, an application to be deployed on the IT resources; determine a maturity level of the application to be deployed, based on information from the application development repository; generate one or more configurations based on the IT resources for the application to be deployed, the one or more configurations generated according to the maturity level; allocate the IT resources specified for the one or more configurations for the application to be deployed; and deploy the application to be deployed on the allocated IT resources as described in further detail in FIG. 15. The processor 2200 is configured to allocate the IT resources specified for the one or more configurations for the application to be deployed through a creation of at least one of a storage volume and a virtual VM from the IT resources as described, for example, in FIG. 18.

In example implementations, resource group table 2580 contains information relating the IT resources that are available for one or more application maturity levels, which can be used by processor 2200 to allocate the IT resources specified for the one or more configurations for the application to be deployed based on the information relating the IT resources that are available for the one or more application maturity levels. Timeout definition table 2590 can also contain information indicative of a relationship between one or more application maturity levels and one or more timeouts; wherein the processor 2200 is configured to generate one or more configurations based on the IT resources for the application to be deployed, by a calculation of a time required for deployment of each of the one or more configurations; and a determination of the timeout for the one or more configurations based on the application maturity level of the application to be deployed and the relationship between the one or more application maturity levels and the one or more timeouts. For the time required for deployment exceeding the determined timeout, the processor 2200 is configured to provide an indication of the timeout being exceeded, and the processor 2200 is configured to allocate the IT resources specified for the one or more configurations for the application to be deployed when the time required for deployment does not exceed the determined timeout as described in FIGS. 13 and 15.

Figure 16:
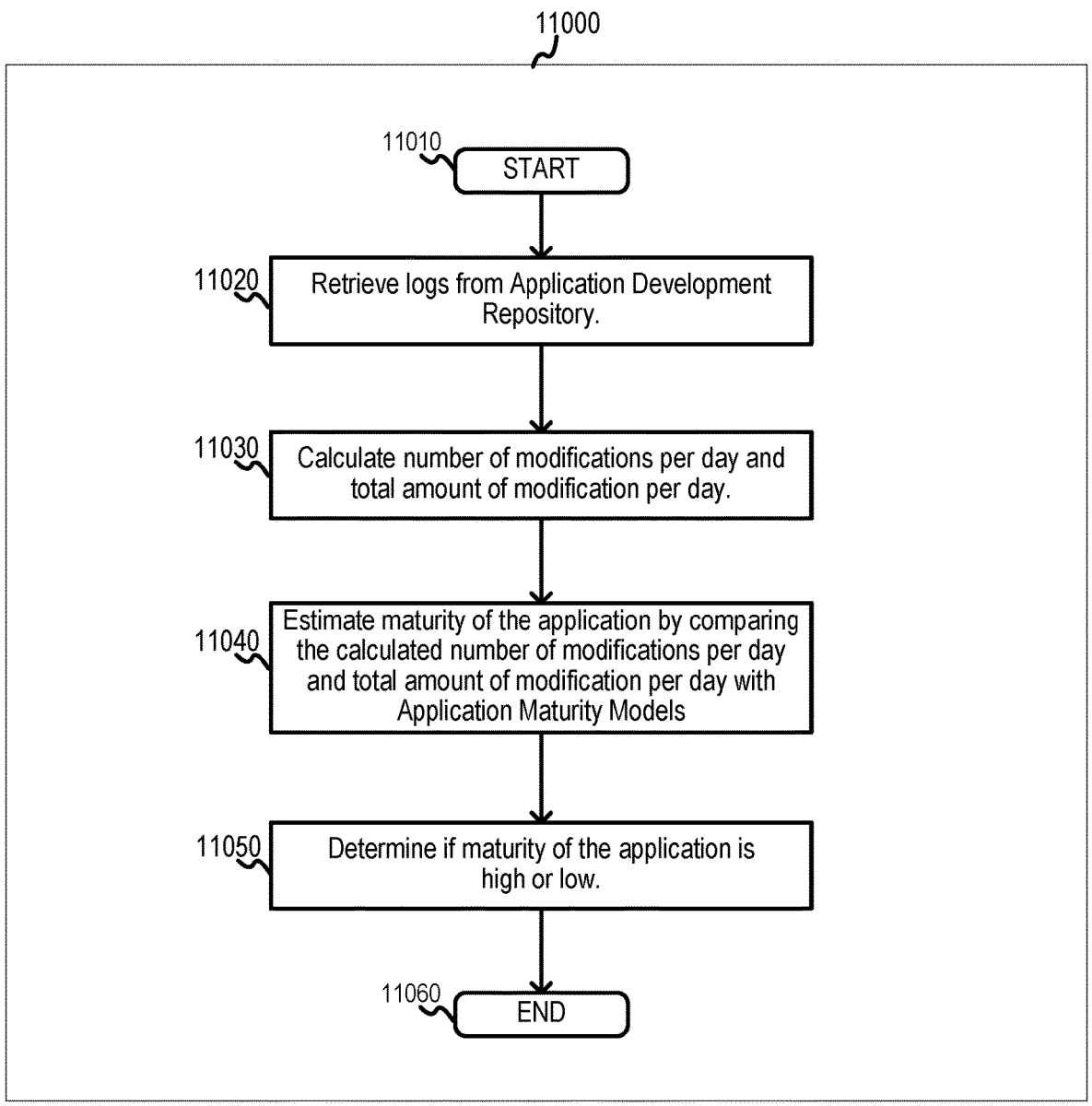
FIG. 16 illustrates a flowchart of management program for calculating maturity of an application, in accordance with an example implementation.

In example implementations, processor 2200 is configured to determine a maturity level of the application to be deployed, based on information from the application development repository, by retrieving the information from the application development repository, wherein the information from the application development repository comprises one or more application logs of the application to be deployed; calculating modifications made over a period of time and a total number of modifications over the period of time for the application to be deployed; and applying one or more maturity models to the modifications made over the period of time and the total number of modifications over the period of time for the application to be deployed as described, for example, in FIGS. 16 and 17.

Figure 19:
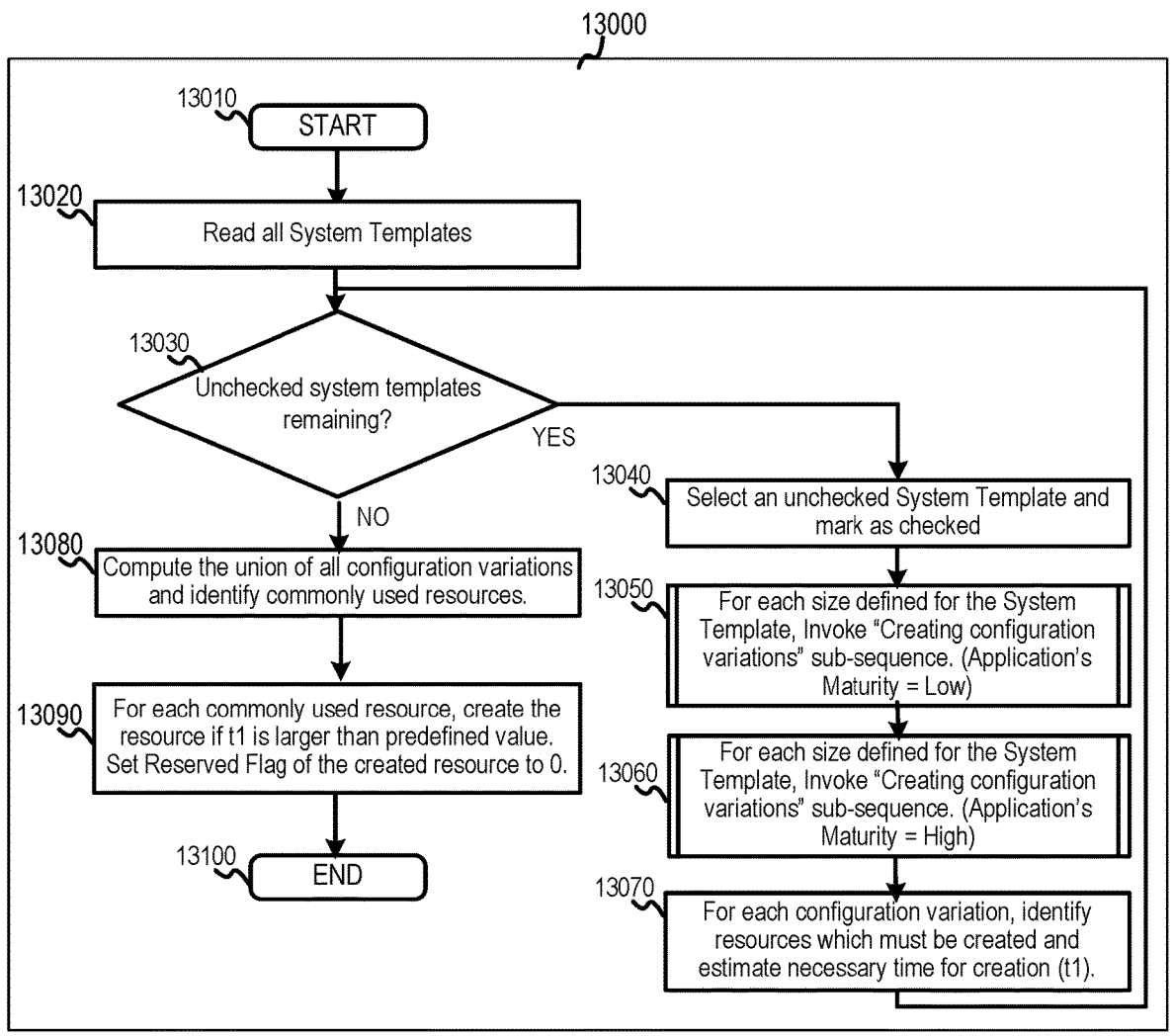
FIG. 19 illustrates a flowchart of management program for preparing IT resources, in accordance with an example implementation.

In example implementations, the processor 2200 is configured to allocate the IT resources through the use of one or more system templates; wherein the processor 2200 is configured to create the one or more configurations based on the one or more system templates; identify commonly used resources from the IT resources across the one or more configurations; and create the commonly used resources from the IT resources as described, for example, in FIG. 19.

Figure 20:
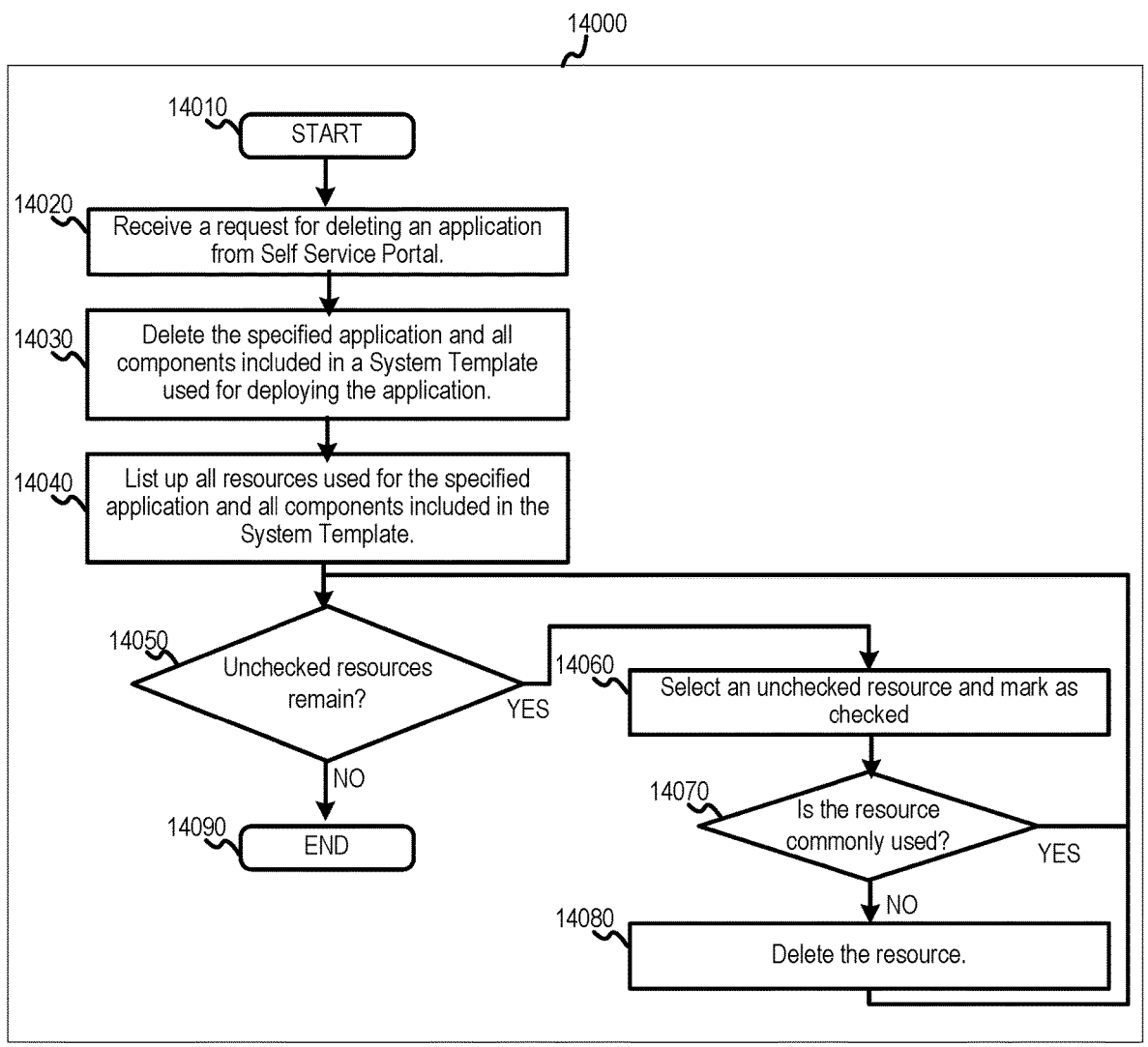
FIG. 20 illustrates a flowchart of management program for deleting IT resources, in accordance with an example implementation.

In example implementations for receipt of a request for deleting another application, the processor 2200 is configured to delete the IT resources utilized by the another application for a determination that the IT resources are not the commonly used resources as described, for example, in FIG. 20.

Figure 24:
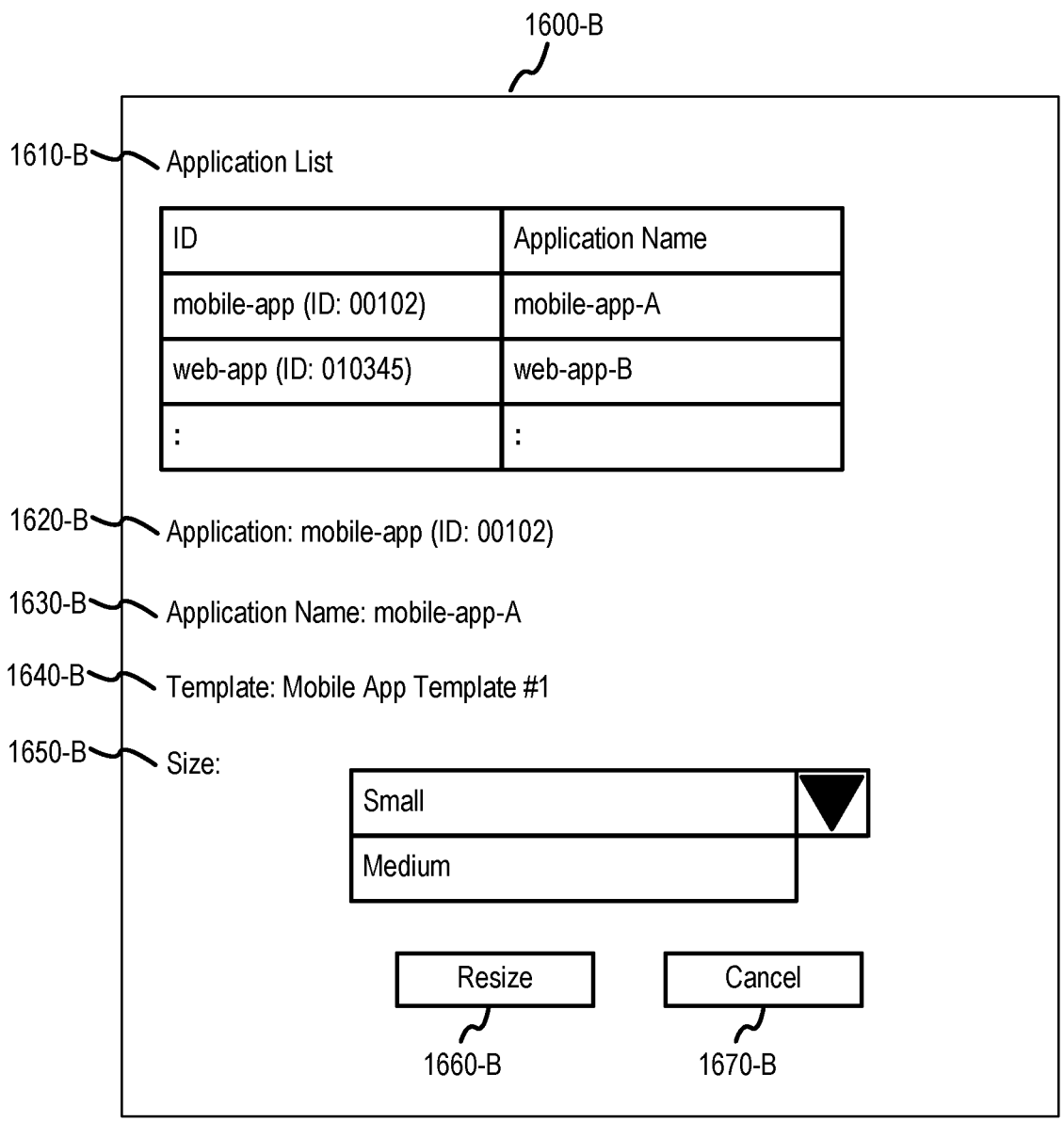
FIG. 24 illustrates a GUI of a self-service portal, in accordance with an example implementation.
Figure 25:
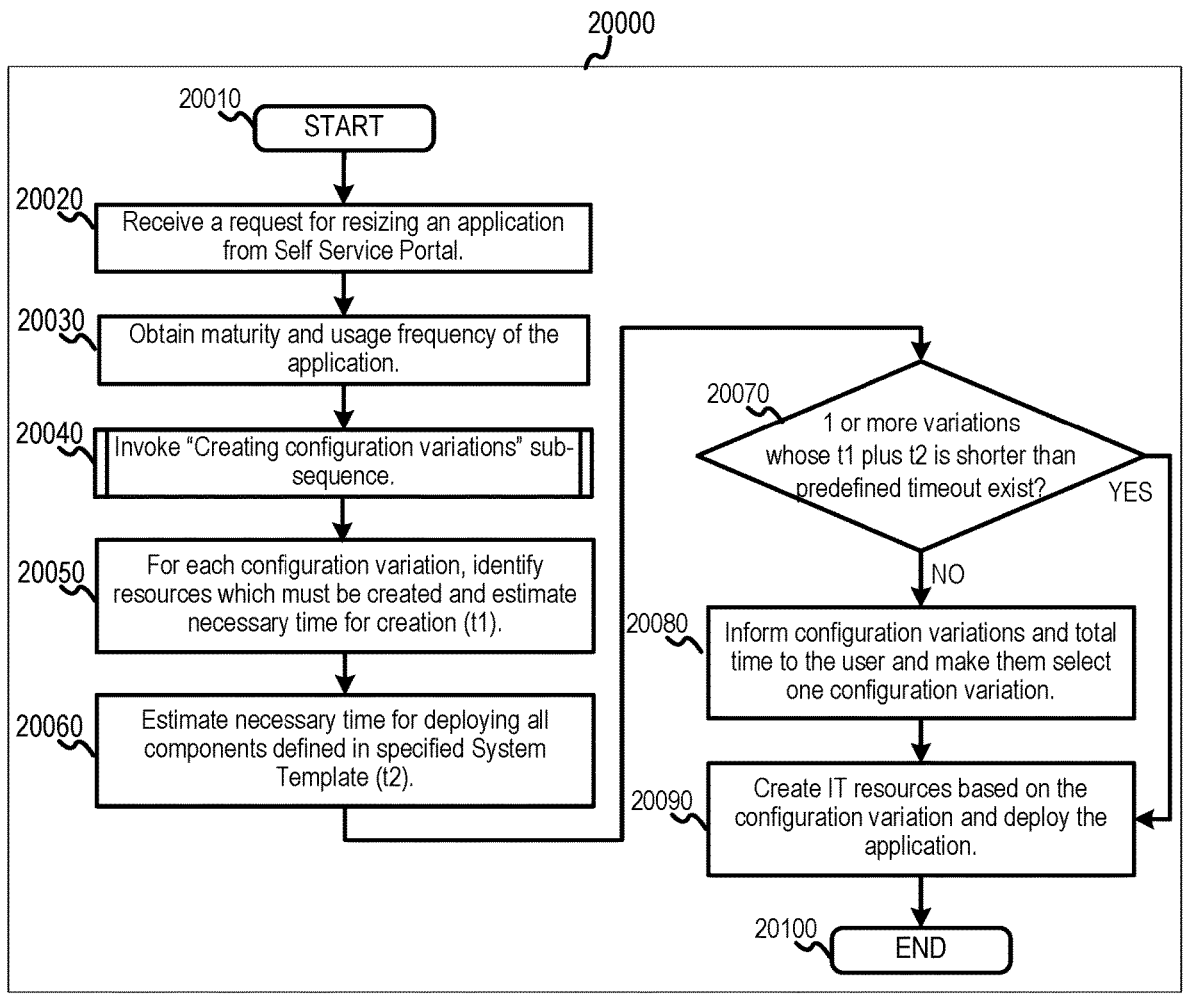
FIG. 25 illustrates a flowchart of management program for resizing an application, in accordance with an example implementation.

In example implementations for receipt of a request for resizing another application, the processor is configured to determine a maturity level and usage frequency of the another application; and generate one or more configurations based on the IT resources for the application to be deployed, the one or more configurations generated according to the maturity level and the usage frequency as described, for example, in FIG. 24 and FIG. 25.

Figure 3:
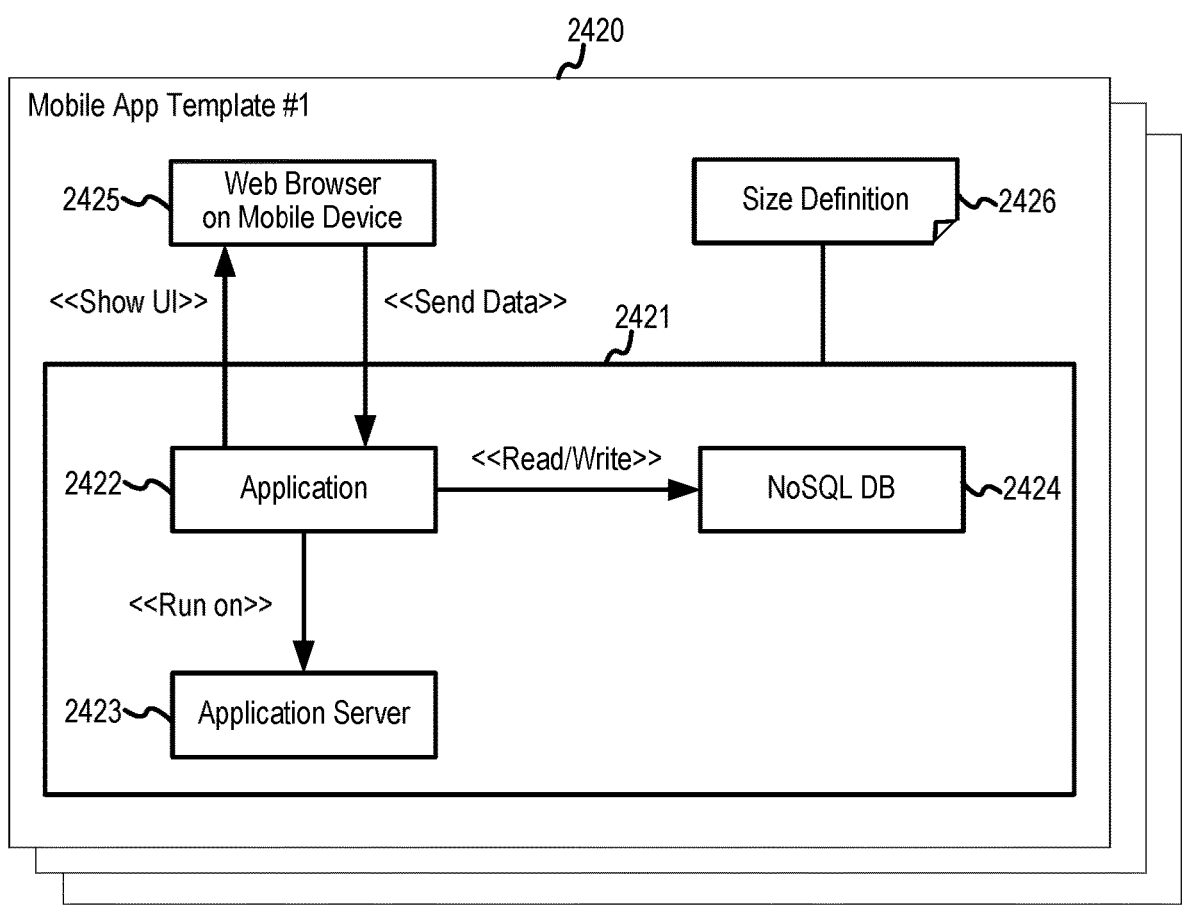
FIG. 3 illustrates system templates, in accordance with an example implementation.

FIG. 3 illustrates system templates 2420, in accordance with an example implementation. These templates are loaded from local disk 2400 to memory 2500 and used processor 2200 of the management computer 2000. Application developer 1010 creates an application and deploys the application on IT infrastructure 1500 by selecting a system template via self-service portal 1300.

In particular, FIG. 3 illustrates an example of a system template named "Mobile App Template #1". This template has deployment target 2421 which shows a set of components being deployed. Deployment target 2421 of this template includes application 2422 and application server 2423 and NoSQL DB (database) 2424. A system created by using this template may include a web browser on a mobile device 2425, but such a web browser not be deployed. This example template also has a size definition 2426.

Figure 4:
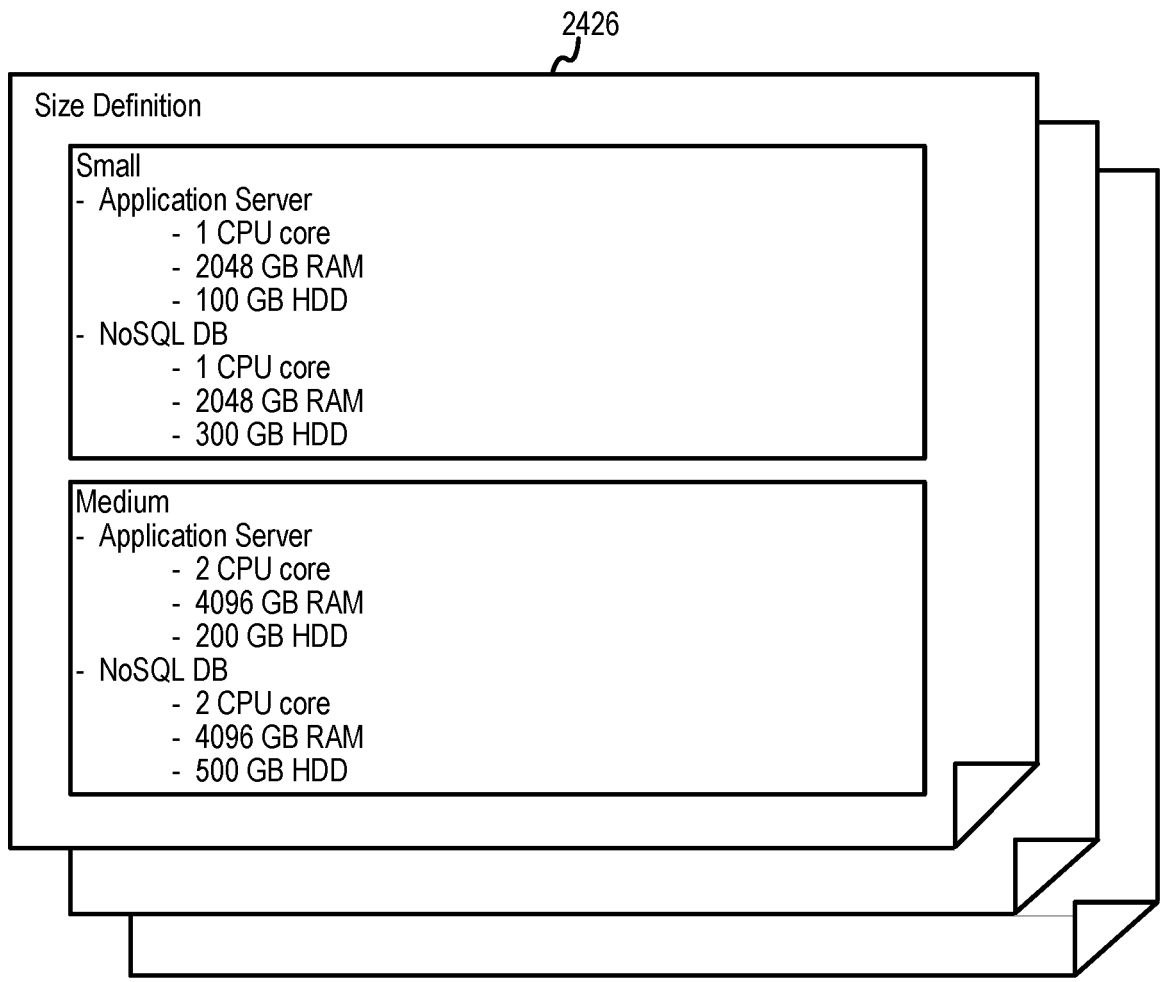
FIG. 4 illustrates a size definition for a template, in accordance with an example implementation.

FIG. 4 illustrates a size definition 2426 for a template, in accordance with an example implementation. A size definition describes available options of size of a system being deployed. Specifically, FIG. 4 shows an example of a size definition for a system template named "Mobile App Template #1". In an example implementation, small size or medium size can be selected for the system.

Figure 5:
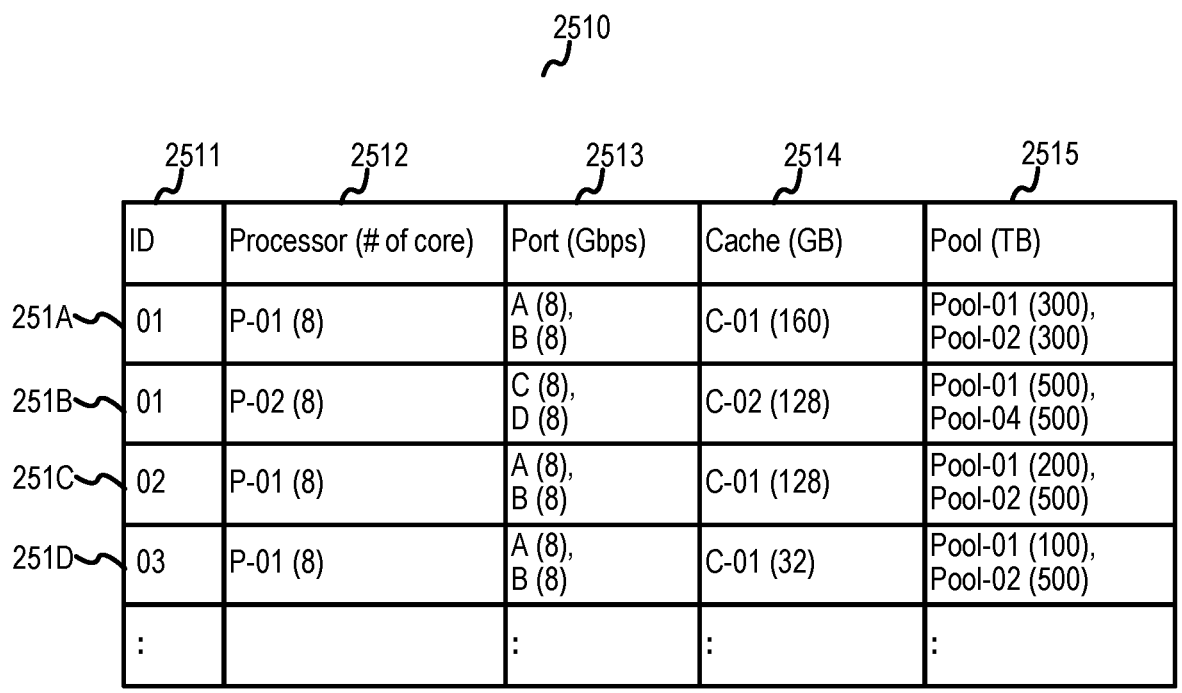
FIG. 5 illustrates the physical storage table, in accordance with an example implementation.

FIG. 5 illustrates the physical storage table 2510, in accordance with an example implementation. This table is created in the memory 2500 by management program 2410. Column 2511 shows identifications for the storage arrays. Column 2512 shows the processors of the storage arrays. Column 2513 shows the ports of the storage arrays. Column 2514 shows cache resources of the storage arrays. Column 2515 shows the pools of resources (typically capacities) of the storage arrays. Each row (251A, 251B, 251C, 251D) shows the configuration of each physical storage array. For example, rows 251A and 251B shows configurations of storage array 01. The storage array has two processors with 8 cores each, 8 Gbps of port A, B, C and D, 160 GB of cache C-01 and 128 GB of cache C-02, 300 TB of pool Pool-01 and Pool-02, and 500 TB of pool Pool-03 and Pool-04.

FIG. 6 illustrates a storage volume table 2520, in accordance with an example implementation. This table is created in the memory 2500 by management program 2410. Column 2521 shows the identifications of storage arrays owning storage volumes. Column 2522 shows the identifications of storage volumes. Column 2523 shows the capacities of each storage volume. Column 2524 shows the identifications of pools from which storage volumes are curved. Column 2525 shows the flags indicating whether each volume is reserved for a particular user or a particular system. Column 2526 shows the media types of storage volumes.

Each row (252A, 252B, 252C, 252D, 252E) shows the configuration of each storage volume. For example, row 252A shows a configuration of storage volume 01 of storage array 01. This storage volume has 10 TB of capacity, curved from Pool-01, reserved for a particular user or a particular system and its media type is solid state drive (SSD).

FIG. 7 illustrates a physical server table 2530, in accordance with an example implementation. This table is created in the memory 2500 by management program 2410. Column 2531 shows the identifications of physical servers. Column 2532 shows the numbers of cores and types of CPU of each physical server. Column 2533 shows the capacities of memory resources of each physical server. Column 2534 shows the ports of each physical server.

Each row (253A, 253B, 253C, 253D) shows the configuration of each physical server. For example, row 253A shows a configuration of physical server 01. The physical server has 12 cores of Normal CPU, 32 GB of memory, and 4 Gbps of port A and B.

FIG. 8 illustrates a virtual server table 2540, in accordance with an example implementation. This table is created in the memory 2500 by management program 2410. Column 2541 shows the identifications of the virtual servers. Column 2542 shows the identifications of the physical servers on which the virtual servers are running. Column 2543 shows the numbers of CPU cores assigned to each virtual server. Column 2544 shows the capacities of memory resources assigned to each virtual server. Column 2545 shows the ports assigned to each virtual server. Column 2546 shows the flags indicating whether each virtual server is reserved for a particular user or a particular system. Column 2547 shows the storage capacity allocated to each virtual server.

Each row (254A, 254B, 254C, 254D) shows the configuration of each virtual server. For example, row 254A shows a configuration of virtual server 01. This virtual server is hosted on physical server 01, has 2 CPU cores, 4 GB of memory and 4 Gbps of port A, 500 GB of storage capacity, and reserved for a particular user or a particular system.

FIG. 9 illustrates a mapping table 2550, in accordance with an example implementation. This table is created in the memory 2500 by management program 2410. Column 2551 shows the identifications of applications. Column 2552 shows the names of the applications. This name is specified in Application name field 1620-A of GUI 1600-A of self-service portal 1600 by application developer 1010.

Column 2553 shows identifications of templates. This identification of a template is specified in Template drop down list 1630-A of GUI 1600-A of self-service portal 1600 by application developer 1010. Column 2554 shows the identifications of virtual servers on which the applications are running. Column 2555 shows the names of the virtual servers. In this example implementation, these names are automatically created based on application name by management program, however other implementations are possible depending on the desired implementation. For example, application administrator can specify the name of each virtual server. Column 2556 shows the identifications of ports of the virtual servers. Column 2557 shows the identifications of storage arrays. Column 2558 shows the identifications of ports of the storage arrays. Column 2559 shows the identifications of storage volumes.

Each row (255A, 255B, 255C, 255D, 255E, 255F, 255G) shows the end-to-end mapping between applications and storage volumes. For example, row 255B shows that application 2 has name of "Web-C", is created from template 4, is running on virtual server 03 whose name is "WebDB", and also two storage volumes 052 and 055 are assigned to the virtual server 03 for the application. The storage volume 052 of storage array 02 is assigned to the virtual server 03 through the port B of the storage array and the port A of the virtual server. The storage volume 055 of storage array 01 is assigned to the virtual server 03 through the port A of the storage array and the port A of the virtual server.

Figure 10:
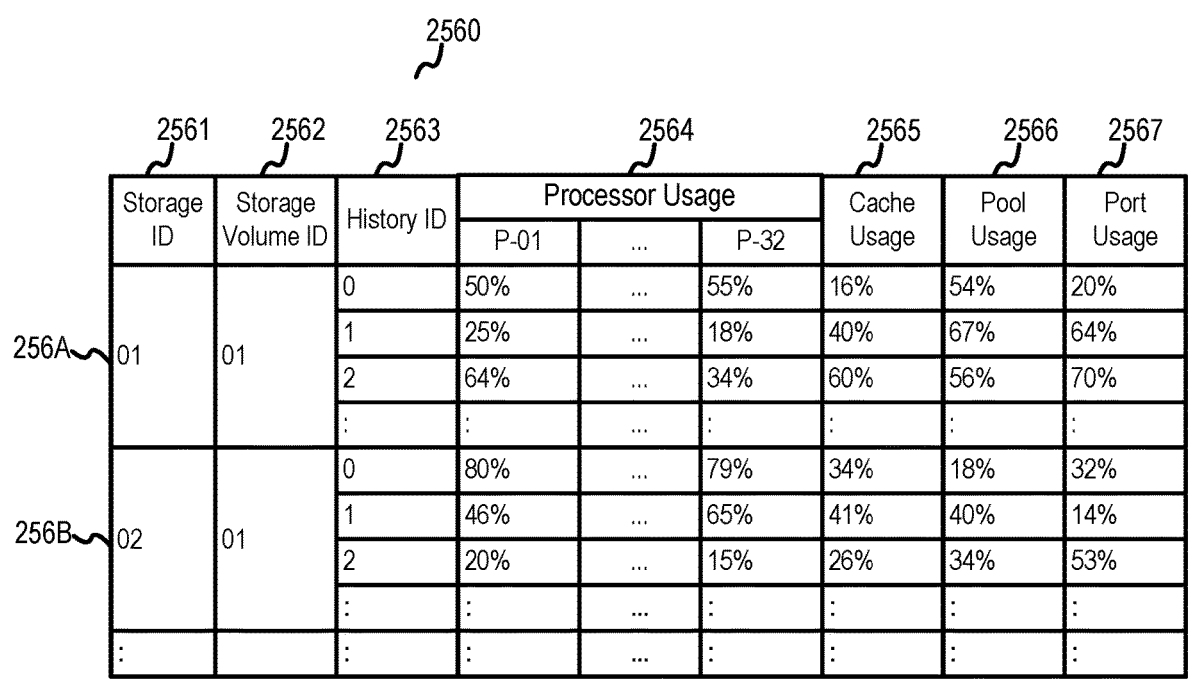
FIG. 10 illustrates a storage performance table, in accordance with an example implementation.

FIG. 10 illustrates a storage performance table 2560, in accordance with an example implementation. This table is created in the memory 2500 by management program 2410. Column 2561 shows the identifications of storage arrays. Column 2562 shows the identifications of storage volumes. Column 2563 shows the identifications of historical performance data of the storage volumes. Timestamps can be used as the history ID 2563. Column 2564 shows the usage rates of processors. Column 2565 shows the usage rate of cache resources assigned to the storage volumes. Column 2566 shows the usage rate of pools from which the storage volumes are curved. Column 2567 shows the usage rate of ports assigned to the storage volumes. Each row (256A, 256B) shows the historical performance data of each storage volume. For example, row 256A shows performance data of storage volume 01 of storage array 01 which has at least three records of historical data (from 0 to 2).

FIG. 11 illustrates the server performance table 2570, in accordance with an example implementation. This table is created in the memory 2500 by management program 2410. Column 2571 shows the identifications of physical and/or virtual servers. Column 2572 shows the flags indicating whether the servers are physical server or not. If the value is "YES" then the server is a physical server. If the value is "NO" then the server is a virtual server. Column 2573 shows the identifications of historical performance data of the servers. Timestamps can be used as the history ID 2573. Column 2574 shows the usage rates of CPUs of the servers. Column 2575 shows the usage rate of memory resources of the servers. Column 2576 shows the usage rate of disks of the servers. Column 2577 shows the usage rate of ports of the servers.

Each row shows the historical performance data of each server. For example, row 257A shows performance data of server 01 which is a physical server and has at least three historical data (from 0 to 2).

FIG. 12 illustrates a resource group table 2580, in accordance with an example implementation. This table is created in the memory 2500 by management program 2410. Column 2581 shows the type of resource. Column 2582 shows the identifications of resources. Column 2583 shows the corresponding maturities of applications.

Each row (258A, 258B, 258C, 258D, 258E, 258F, 258G) shows a resource assigned to a maturity definition. For example, row 258A shows that storage array 01 is assigned to "High" maturity. This means that storage array 01 can be used only for applications having high maturity. The example of the resource group table shown in FIG. 12 contains only storage arrays and physical servers, however, this table may contain other types of resources depending on the desired implementation.

FIG. 13 illustrates a timeout definition table 2590, in accordance with an example implementation. This table is created in the memory 2500 by management program 2410. Column 2591 shows the maturity level of the application. Column 2592 shows the timeouts for creating configuration variations during application deployment process. Each row (259A, 259B) shows a timeout value defined for each maturity. For example, row 259A shows a timeout value of 60 second defined for a low maturity application. Values of timeouts can be represented in other ways. For example, timeouts can be represented as number of configurations variations to be created, or other methods depending on the desired implementation.

Figure 14:
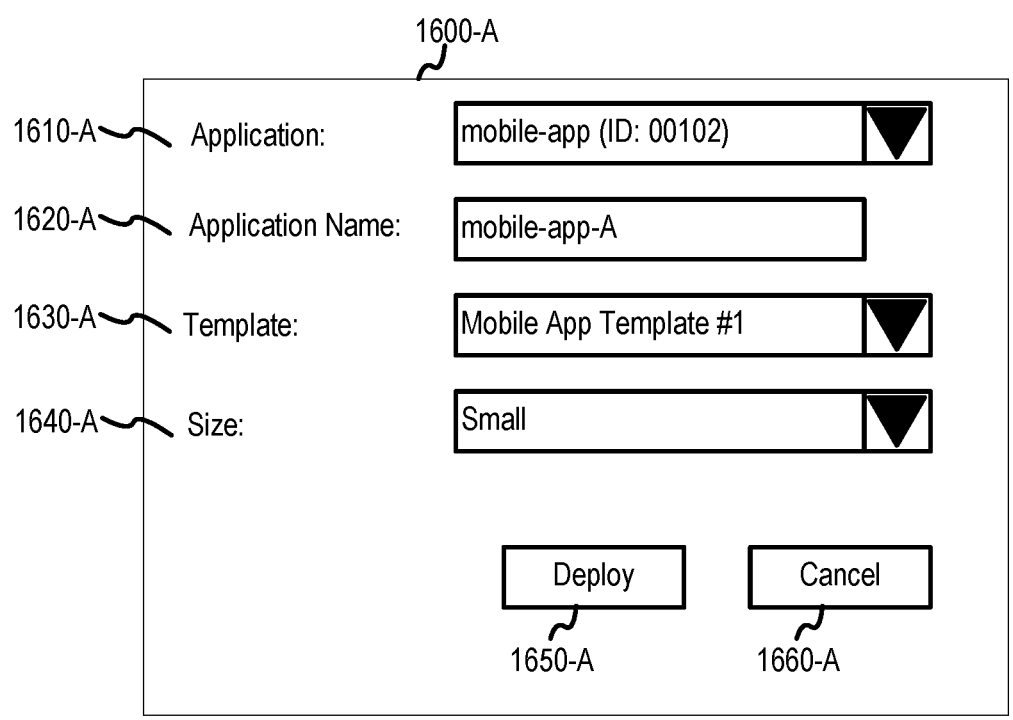
FIG. 14 illustrates a graphical user interface (GUI) of a self-service portal, in accordance with an example implementation.

FIG. 14 illustrates a GUI 1600-A of self-service portal 1600, in accordance with an example implementation. This GUI is used when application developer 1010 deploys an application. The application developer selects an application 1610-A, a system template 1630-A and a size 1640-A, and inputs an application name 1620-A. ID shown in Application field 1610-A is an identification of the application in Application Development Repository 1100.

If deploy button 1650-A is clicked, management program 2410 deploys the specified application by using the specified system template. If cancel button 1660-A is clicked, management program 2410 cancels the application deployment process.

FIG. 15 shows a flowchart of management program 2410 for deploying an application, in accordance with an example implementation. The flow begins at 10010, where the procedure is initiated. At 10020, the Management program 2410 receives a request for deploying an application from the self-service portal 1600. Parameters shown in FIG. 14 are passed to Management program 2410. At 10030, Management program 2410 invokes "Calculating application maturity" sub-sequence which is disclosed in further detail below. At 10040, the Management program 2410 invokes "Creating configuration variations" sub-sequence which is disclosed in further detail below. At 10050, for each configuration variation created in the flow at 10040, management program 2410 identifies resources which must be created and estimates necessary time for creation (which is referred as "t1"). For example, if a configuration variation can include a VM having 4 CPU cores, 8192 GB RAM and 500 GB HDD and a 4 TB SSD storage volume, and a storage volume satisfying the requirement exist, then management program 2410 decides only the VM must be created. Management program 2410 can decide whether such storage volume or VM exist or not by referring Storage Volume table 2520 in FIG. 6 and Virtual Server table 2540 in FIG. 8. Specifically, the management program 2410 checks if a storage volume having 4 TB capacity, 0 value of reserved flag and SSD media type exist in Storage Volume table 2520. A storage volume shown in row 252D matches the requirement so management program 2410 decides the volume can be used. Management program 2410 also checks if a VM having 4 CPU cores, 8192 GB RAM, 500 GB HDD and 0 value of reserved flag exist in Virtual Server table 2540 in FIG. 8. In Virtual Server table 2540 in FIG. 8 doesn't have a VM satisfying the requirement so management program 2410 decides the VM must be created. Management program 2410 can estimate t1 based on predefined creation time (e.g. creation of 1 VM takes 5 min) or average time of creation which has been done previously. In the example above, management program 2410 can estimate t1 as 5 min for instance.

At 10060, the Management program 2410 estimates necessary time for deploying all components defined in the specified system template. The time is referred as "t2". Management program 2410 can estimate t2 based on predefined deployment time (e.g. deployment of 1 application server takes 1 min) or average time of deployment which has been done previously. At 10070, the Management program 2410 judges if 1 or more configuration variations whose t1 plus t2 is shorter than predefined timeout exist or not. If the result is No then the process proceeds to the flow at 10080. If the result is Yes then the process proceeds to the flow at 10090.

At 10080 the Management program 2410 informs configuration variations and total time (i.e. t1 plus t2) to the user and makes them select one configuration variation. At 10090, the Management program 2410 creates IT resources based on the configuration variation and deploys the application. Management program 2410 creates records of created IT resources in Storage Array table 2510, Storage Volume table 2520, Physical Server table 2530, Virtual Server table 2540 and mapping information from the application to IT resources in Mapping table 2550. At 10100, the Management program 2410 quits the application deployment process.

FIG. 16 illustrates a flowchart of management program 2410 for calculating maturity of an application, in accordance with an example implementation. The flow begins at 11010, when the procedure is initiated. At 11020, the Management program 2410 retrieves logs from application development repository 1100. The logs may include logs of committing files (e.g. source codes, binaries or configuration files) into the repository, identification of an application and timestamp of each commit. At 11030, the Management program 2410 calculates the number of modifications per day and total amount of modification per day. The former can be calculated based on number of committing and the latter can be calculated based on number of modified lines of source codes. At 11040, the Management program 2410 estimates the maturity of the application by comparing the calculated number of modifications per day and total amount of modification per day with Application Maturity Models. At 11050, the Management program 2410 determines if maturity of the application is high or low. This can be done by comparing the maturity estimated in the flow at 11040 with a predefined threshold. At 11060, the Management program 2410 quits the process.

FIG. 17 illustrates application maturity models, in accordance with an example implementation. There are two examples of application maturity models in FIG. 17. Each model shows relationship between a combination of number of modifications per day and total amount of modification per day, and the maturity level of the application.

Figure 18:
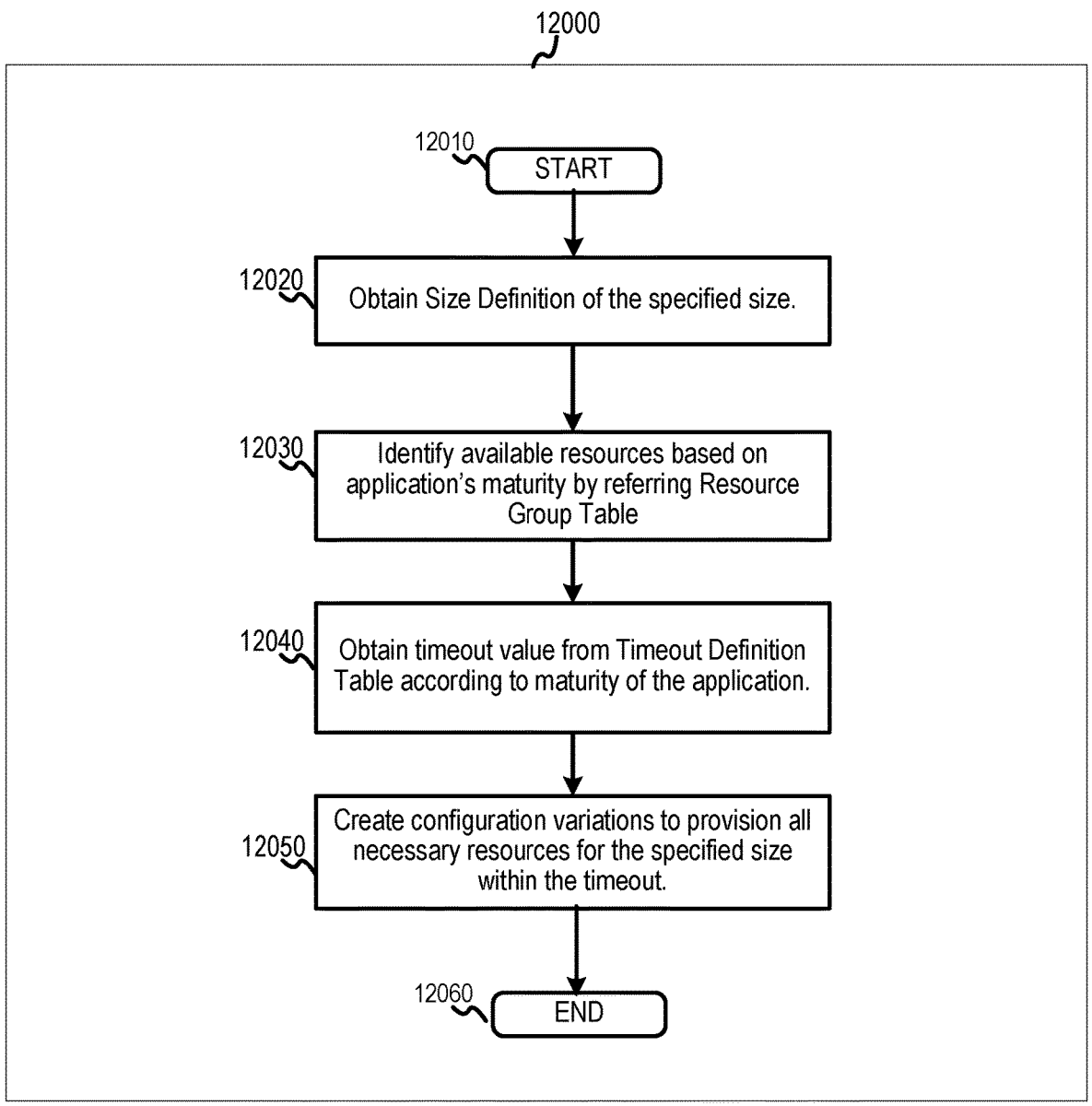
FIG. 18 illustrates a flowchart of management program for creating configuration variations, in accordance with an example implementation.

FIG. 18 illustrates a flowchart of management program 2410 for creating configuration variations, in accordance with an example implementation. The flow is initiated at 12010, when the procedure begins. At 12020, the Management program 2410 obtains a size definition of the specified size. At 12030, the Management program 2410 identifies available resources based on the maturity level of the applications by referring Resource Group Table 2580. Based on the example of Resource Group table 2580 shown in FIG. 12, if the maturity level of the application is High, then storage array 01, 02 and 03, and physical server 02 and 03 are made to be available. Management program 2410 can obtain details of available storage arrays and storage volumes held by these storage arrays from Storage Array table 2510 and Storage Volume table 2520, and details of available physical servers and virtual servers running on these physical servers from Physical Server table 2530 and Virtual Server table 2540.

At 12040, the Management program 2410 obtains timeout value from Timeout Definition Table 2590 according to the maturity of the application. Based on the example of Timeout Definition table 2590 shown in FIG. 13, if the maturity level of the application is High then timeout value is set to 120 seconds. At 12050, the Management program 2410 creates configuration variations to provision all necessary resources for the specified size within the timeout. Management program 2410 may create configuration variations based on performance information of servers and storage arrays to make burden of each servers and storage arrays balanced. Management program 2410 may create configuration variations based on types of storage media or capabilities of servers or storage arrays.

For example, management program 2410 picks up one or more storage array having lowest average processor usage from Storage Performance table 2560 in FIG. 10, and one or more physical server having lowest average CPU usage from Server Performance table 2570 in FIG. 11.

Assume that management program 2410 obtains storage array 01 and 02, and physical server 01. Then, management program 2410 obtains one or more processors, caches, pools and ports of the selected storage arrays (01 and 02 in the example above) based on average usages. Management program 2410 creates configuration variations based on all combinations of processors, caches, pools and ports of selected storage arrays and selected physical servers.

An example of configuration variations may be as following.

Configuration variation #1

A VM (with 1 CPU core and 2048 GB RAM) on physical server 01 is connected to a storage volume (with 100 GB capacity) in storage array 01 via port A, and processor P-02 controls I/O from the VM to the storage volume. The storage volume is curved from Pool-01 and cache C-01 is allocated to the storage volume.

Configuration variation #2

A VM (with 1 CPU core and 2048 GB RAM) on physical server 01 is connected to a storage volume (with 100 GB capacity) in storage array 01 via port C, and processor P-03 controls I/O from the VM to the storage volume. The storage volume is curved from Pool-02 and cache C-02 is allocated to the storage volume.

Configuration variation #3

A VM (with 1 CPU core and 2048 GB RAM) on physical server 01 is connection to a storage volume (with 100 GB capacity) in storage array 02 via port B, and processor P-01 controls I/O from the VM to the storage volume. The storage volume is curved from Pool-01 and cache C-01 is allocated to the storage volume.

At 12060, the Management program 2410 quits the process.

FIG. 19 illustrates a flowchart of management program 2410 for preparing IT resources, in accordance with an example implementation. This process can be executed independent from and in parallel with deploying an application sequence in FIG. 15. The flow is initiated at 13010, wherein the procedure starts. At 13020 the Management program 2410 reads all system templates. At 13030, the Management program 2410 judges if there remain system templates that have not been checked by the Management program 2410. If the result is Yes then the process proceeds to the flow at 13040. If the result is No then the process proceeds to the flow at 13080.

At 13040, the management program 2410 selects an unchecked system template and mark it as checked. At 13050, for each size defined for the System Template, management program 2410 invokes creating configuration variations sub-sequence. In this flow, the management program 2410 assumes that the maturity level of the application is low. At 13060, for each size defined for the System Template, management program 2410 invokes creating configuration variations sub-sequence. In this flow, the management program 2410 assumes that application maturity level is high. At 13070, for each configuration variation, management program 2410 identifies resources which must be created and estimate necessary time for creation (t1). The way to identify resources which must be created and to estimate t1 is same as the flow at 10050 in FIG. 15.

At 13080, the Management program 2410 computes the union of all configuration variations and identifies commonly used resources. Management program 2410 may determine that a resource is commonly used if the resource appears in more variations than predefined number. Management program 2410 may weigh the number of appearance of resources based on maturities of all applications stored in application development repository 1100. If there are 10 applications of a low maturity level and 5 applications of a high maturity level, then management program 2410 may double count the number of resources appears in configuration variations created in the flow at 13050.

An example of configuration variations may be as following.

Configuration variation #1

A VM (with 1 CPU core and 2048 GB RAM) on physical server 01 is connected to a storage volume (with 100 GB capacity) in storage array 01 via port A, and processor P-02 controls I/O from the VM to the storage volume. The storage volume is curved from Pool-01 and cache C-01 is allocated to the storage volume.

Configuration variation #2

A VM (with 1 CPU core and 2048 GB RAM) on physical server 01 is connected to a storage volume (with 100 GB capacity) in storage array 01 via port C, and processor P-03 controls I/O from the VM to the storage volume. The storage volume is curved from Pool-02 and cache C-02 is allocated to the storage volume.

Configuration variation #3

A VM (with 2 CPU core and 4096 GB RAM) on physical server 01 is connection to a storage volume (with 200 GB capacity) in storage array 02 via port B, and processor P-01 controls I/O from the VM to the storage volume. The storage volume is curved from Pool-01 and cache C-01 is allocated to the storage volume.

According to the example above, management program 2410 may decide "a VM (with 1 CPU core and 2048 GB RAM) on physical server 01" and "a storage volume (with 100 GB capacity) in storage array 01" as commonly used resources if the predefined number of appearances is 2.

At 13090, for each commonly used resource, management program 2410 creates the resource if t1 is larger than predefined value, and set the Reserved Flag of the created resource to 0. This indicates that the created resource is not reserved for a particular user or a particular system so that any users can use the created resource. When the created resource become to be used by a user, Reserved Flag should be set to 1. At 13100, the Management program 2410 quits the process.

FIG. 20 illustrates a flowchart of management program 2410 for deleting IT resources, in accordance with an example implementation. Self-Service Portal 1300 may have a GUI to delete an application and the underlying IT resources. The flow is initiated at 14010, wherein the procedure begins. At 14020, the Management program 2410 receives a request for deleting an application from self-service portal 1300. At 14030, the Management program 2410 deletes the specified application and all components included in a System Template used for deploying the application. At 14040, the Management program 2410 lists up all resources used for the specified application and all components included in the System Template. This process is done by referring to Mapping table 2550. If an application shown in row 255B in FIG. 9 is specified for deletion, management program 2410 lists up virtual server port A, storage port B of storage array 02, storage port A of storage array 01, storage volume 052 of storage array 02 and storage volume 055 of storage array 01 as resources used for the specified application.

At 14050, the Management program 2410 judges if there are unchecked resources remaining. If the result is Yes then the process proceeds to the flow at 14060. If the result is No then the process proceeds to the flow at 14090.

At 14060, the Management program 2410 selects an unchecked resource and mark it as checked. At 14070, the Management program 2410 judges if the resource is commonly used or not. This process can be done by comparing information of resources listed in the flow at 14040 with the information of commonly used resources determined in the flow at 13080 in FIG. 19. Resources listed in the flow at 14040 can be obtained from Storage Array table 2510, Storage Volume table 2520, Physical Server table 2530 and Virtual Server table 2540.

For example, if management program 2410 determined "a VM (with 1 CPU core and 2048 GB RAM) on physical server 01" and "a storage volume (with 100 GB capacity) in storage array 01" as commonly used resources in the flow at 13080 in FIG. 19, and resources listed up in step 14040 contains a storage volume (with 100 GB capacity) in storage array 01 then management program 2410 judges the storage volume is commonly used.

If the result is Yes then the process proceeds to the flow at 14050. If the result is No then the process proceeds to the flow at 14080. At 14080, the Management program 2410 deletes the resource. At 14090, the Management program 2410 quits the process.

In this first example embodiment, the management program creates IT resources and deploys an application on the IT resources based on the maturity level of the application. Management program also prepares commonly used IT resources and also deletes only resources which are not commonly used. Through such implementations, management program can deploy an application on proper IT resources in an agile manner.

In a second example embodiment, management program modifies configurations of IT resources to resize applications while taking the maturity and usage frequency of the application into consideration.

Figure 21:
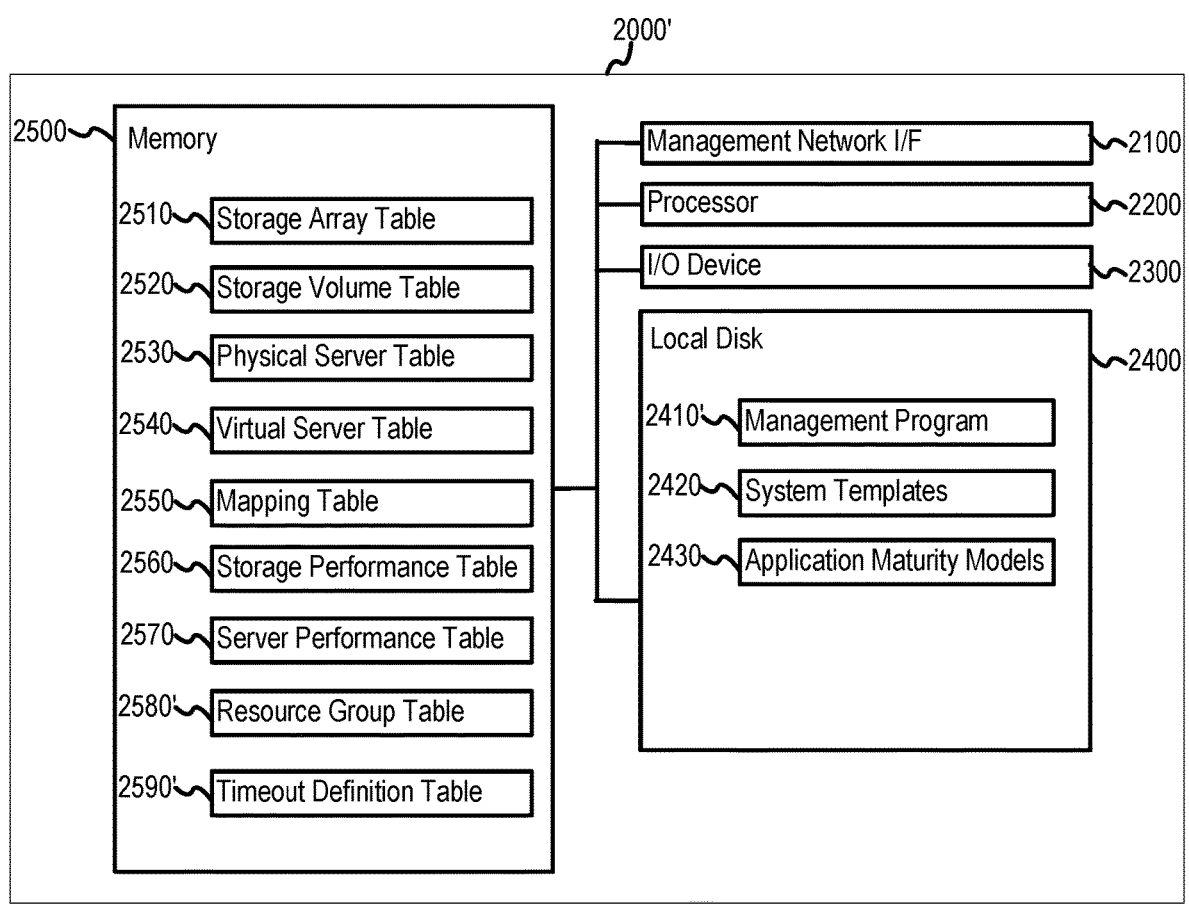
FIG. 21 illustrates the configurations of management computer, in accordance with a second example embodiment.

FIG. 21 illustrates the configurations of management computer 2000', in accordance with a second example embodiment. Configurations of management computer 2000' is similar to the configurations of management computer 2000 in FIG. 2, with the differences indicated below.

Management computer 2000' has Resource Group Table 2580' which has a different structure from Resource Group Table 2580 from the first example embodiment, and Timeout Definition Table 2590' which has a different structure from Timeout Definition Table 2590 in the first example embodiment. Management computer 2000' has Management Program 2410' which has additional functionalities including monitoring of usage of applications and modification of configurations of IT resources to resize applications. For monitoring of usage of applications, existing techniques can be used.

In example implementations, a relationship between one or more application maturity levels, one or more usage frequencies, and one or more timeouts is outlined in Timeout Definition Table 2590', wherein the processor 2200 is configured to generate one or more configurations based on the IT resources for the application to be deployed or resized, by a calculation of a time required for deployment of each of the one or more configurations; and a determination of the timeout for the one or more configurations based on the application maturity level of the application to be deployed or resized, the one or more usage frequencies of the application to be deployed or resized, and the relationship between the one or more application maturity levels and the one or more timeouts. For the time required for deployment exceeding the determined timeout, the processor 2200 is configured to provide an indication of the timeout being exceeded; and the processor 2200 is configured to allocate the IT resources specified for the one or more configurations for the application to be deployed or resized when the time required for deployment does not exceed the determined timeout as described below.

FIG. 22 illustrates resource group table 2580', in accordance with an example implementation. This table is created in the memory 2500 by management program 2410. Column 2581' shows the type of resource. Column 2582' shows the identifications of resources. Column 2583' shows the corresponding maturities of applications. Column 2584' shows the corresponding usage frequency of applications.

Each row (258A', 258B', 258C', 258D', 258E', 258F', 258G') shows a resource assigned to a maturity definition and usage frequency. For example, row 258A' shows that storage array 01 is assigned to "High" maturity and "High" usage frequency. This means that storage array 01 can be used only for applications having a high maturity level and high usage frequency. The example of the resource group table shown in FIG. 22 contains only storage arrays and physical servers but this table may contain other types of resources depending on the desired implementation.

FIG. 23 illustrates timeout definition table 2590', in accordance with an example implementation. This table is created in the memory 2500 by management program 2410. Column 2591' shows the application maturity level. Column 2592' shows the usage frequency of applications. Column 2593' shows the timeouts for creating configuration variations during application deployment process. Each row (259A', 259B', 259C', 259D') shows a timeout value defined for each set of maturity level and usage frequency. For example, row 259A' shows timeout value of 60 second defined for applications having a low maturity level and a low usage frequency. The timeout values can be represented in other ways, depending on the desired implementation. These can be represented as number of configurations variations to be created.

FIG. 24 illustrates a GUI 1600-B of a self-service portal 1600, in accordance with an example implementation. This GUI is used when application developer 1010 or application administrator 1020 modifies size of an application. The application developer or application administrator selects an application from application list 1610-B. Identification, name, template used for deployment and size of selected application are shown in 1620-B, 1630-B, 1640-B and 1650-B respectively. The application developer or application administrator selects a new size from a drop-down list 1650-B. FIG. 24 shows an example case in which an application named "mobile-app-A" is selected and its size is being modified from "Small" to "Medium". If deploy button 1660-B is clicked, management program 2410' resizes the specified application. If cancel button 1670-B is clicked, management program 2410' cancels application resizing process.

FIG. 25 illustrates a flowchart of management program 2410' for resizing an application, in accordance with an example implementation. The flow is initiated at 20010, wherein the procedure begins. At 20020, Management program 2410' receives a request for resizing an application from the self-service portal 1600. Parameters shown in FIG. 24 are passed to Management program 2410'. At 20030, the Management program 2410' obtains the maturity level of the application, which is calculated when the application was deployed. Management program 2410' also obtains the usage frequency of the application through its own monitoring functionality. At 20040, the Management program 2410' invokes "Creating configuration variations" sub-sequence which is disclosed in more detail below. The flow at 20050, 20060, 20070, 20080, 20090 and 20100 are the same as the flow at 10050, 10060, 10070, 10080, 10090 and 10100 in FIG. 15 respectively.

Figure 26:
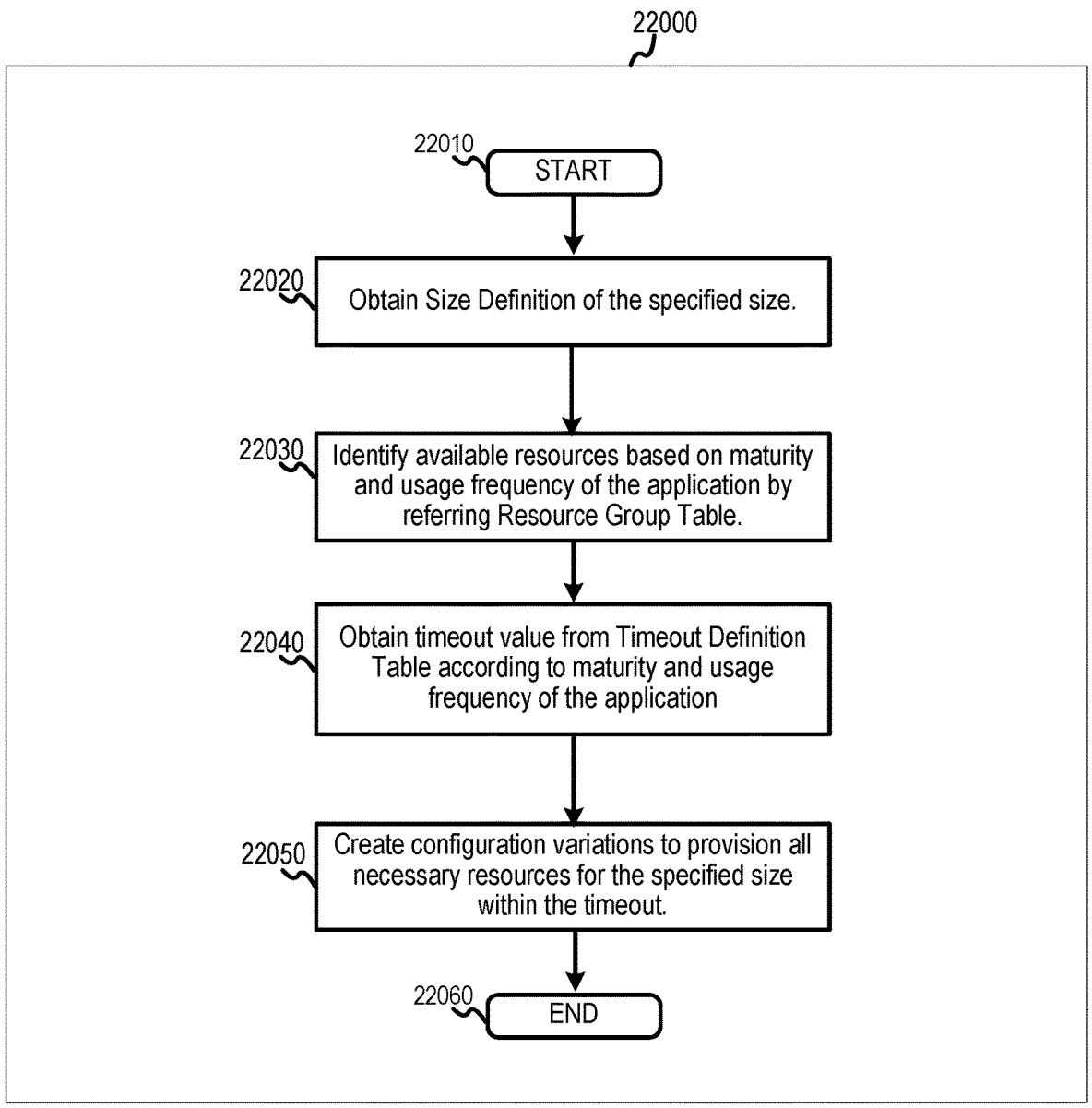
FIG. 26 illustrates a flowchart of management program for creating configuration variations, in accordance with an example implementation.

FIG. 26 illustrates a flowchart of management program 2410' for creating configuration variations, in accordance with an example implementation. The flowchart shown in FIG. 26 is similar to the flowchart in FIG. 18. The differences between these two are the process at 22030 and 22040.

The flow at 22010, 22020, 22060, and 22060 are the same as the flow at 12010, 12020, 12050 and 12060 from FIG. 18, respectively. At 22030, the Management program 2410' identifies available resources based on the maturity level and usage frequency of the application by referring Resource Group Table 2580'. At 22040, the Management program 2410' obtains timeout value from Timeout Definition Table 2590' according to the maturity level and usage frequency of the selected application.

Thus, in the second example embodiment, management program creates configuration variations to resize an application with considering maturity and usage frequency of the application. Through such implementations, management program can resize an application on proper IT resources in an agile manner.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A management computer configured to manage information technology (IT) resources, the management computer communicatively coupled to an application development repository, the management computer comprising:
 a processor, configured to:
  determine, from a request for deploying an application in the application development repository, an application to be deployed on the IT resources;
  determine a maturity level of the application to be deployed, based on information from the application development repository;
  generate one or more configurations based on the IT resources for the application to be deployed, the one or more configurations generated according to the maturity level;
  allocate the IT resources specified for the one or more configurations for the application to be deployed; and deploy the application to be deployed on the allocated IT resources wherein the processor is configured to determine a maturity level of the application to be deployed, based on information from the application development repository, by:
retrieving the information from the application development repository, wherein the information from the application development repository comprises one or more application logs of the application to be deployed;
calculating modifications made over a period of time based on commits indicated in the one or more application logs, and a total number of modifications over the period of time for the application to be deployed based on modified lines of source code indicated in the one or more application logs; and
applying one or more maturity models to the modifications made over the period of time and the total number of modifications over the period of time for the application to be deployed.

2. The management computer of claim 1, further comprising a memory configured to store information relating the IT resources that are available for one or more application maturity levels;
wherein the processor is configured to allocate the IT resources specified for the one or more configurations for the application to be deployed based on the information relating the IT resources that are available for the one or more application maturity levels.

3. The management computer of claim 1, further comprising a memory configured to store a relationship between one or more application maturity levels and one or more timeouts;
wherein the processor is configured to generate one or more configurations based on the IT resources for the application to be deployed, by:
a calculation of a time required for deployment of each of the one or more configurations; and
a determination of the timeout for the one or more configurations based on the application maturity level of the application to be deployed and the relationship between the one or more application maturity levels and the one or more timeouts;
wherein for the time required for deployment exceeding the determined timeout, the processor is configured to provide an indication of the timeout being exceeded;
wherein the processor is configured to allocate the IT resources specified for the one or more configurations for the application to be deployed when the time required for deployment does not exceed the determined timeout.

4. The management computer of claim 1, wherein the processor is configured to allocate the IT resources through the use of one or more system templates;
wherein the processor is configured to:
create the one or more configurations based on the one or more system templates;
identify commonly used resources from the IT resources across the one or more configurations; and
create the commonly used resources from the IT resources.

5. The management computer of claim 4, wherein for receipt of a request for deleting another application, the processor is configured to delete the IT resources utilized by the another application for a determination that the IT resources are not the commonly used resources.

6. The management computer of claim 1, wherein for receipt of a request for resizing another application, the processor is configured to:
determine a maturity level and usage frequency of the another application; and
generate one or more configurations based on the IT resources for the application to be deployed, the one or more configurations generated according to the maturity level and the usage frequency.

7. The management computer of claim 1, further comprising a memory configured to store a relationship between one or more application maturity levels, one or more usage frequencies, and one or more timeouts;
wherein the processor is configured to generate one or more configurations based on the IT resources for the application to be resized, by:
a calculation of a time required for deployment of each of the one or more configurations; and
a determination of the timeout for the one or more configurations based on the application maturity level of the application to be resized, the usage frequency of the application to be resized, and the relationship between the one or more application maturity levels, the one or more usage frequencies, and the one or more timeouts;
wherein for the time required for deployment exceeding the determined timeout, the processor is configured to provide an indication of the timeout being exceeded;
wherein the processor is configured to allocate the IT resources specified for the one or more configurations for the application to be resized when the time required for deployment does not exceed the determined timeout.

8. A non-transitory computer readable medium storing instructions for a management computer configured to manage information technology (IT) resources, the management computer communicatively coupled to an application development repository, the instructions comprising:
determining, from a request for deploying an application in the application development repository, an application to be deployed on the IT resources;
determining a maturity level of the application to be deployed, based on information from the application development repository;
generating one or more configurations based on the IT resources for the application to be deployed, the one or more configurations generated according to the maturity level;
allocating the IT resources specified for the one or more configurations for the application to be deployed; and
deploying the application to be deployed on the allocated IT resources wherein the determining a maturity level of the application to be deployed, based on information from the application development repository comprises:
retrieving the information from the application development repository, wherein the information from the application development repository comprises one or more application logs of the application to be deployed;
calculating modifications made over a period of time based on commits indicated in the one or more application logs, and a total number of modifications over the period of time for the application to be deployed based on modified lines of source code indicated in the one or more application logs; and applying one or more maturity models to the modifications made over the period of time and the total number of modifications over the period of time for the application to be deployed.

9. The non-transitory computer readable medium of claim 8, the instructions further comprising storing information relating the IT resources that are available for one or more application maturity levels, wherein the allocating the IT resources specified for the one or more configurations for the application to be deployed is based on the information relating the IT resources that are available for the one or more application maturity levels.

10. The non-transitory computer readable medium of claim 8, the instructions further comprising storing a relationship between one or more application maturity levels and one or more timeouts;
   wherein the generating the one or more configurations based on the IT resources for the application to be deployed comprises:
      calculating a time required for deployment of each of the one or more configurations; and
      determining the timeout for the one or more configurations based on the application maturity level of the application to be deployed and the relationship between the one or more application maturity levels and the one or more timeouts;
      wherein for the time required for deployment exceeding the determined timeout, the processor is configured to provide an indication of the timeout being exceeded;
      wherein the allocating the IT resources specified for the one or more configurations for the application to be deployed is conducted for when the time required for deployment does not exceed the determined timeout.

11. The non-transitory computer readable medium of claim 8, wherein the instructions further comprise, for receipt of a request for deleting another application, deleting the IT resources utilized by the another application for a determination that the IT resources are not the commonly used resources.

12. The non-transitory computer readable medium of claim 8, wherein the instructions further comprise, for receipt of a request for resizing another application:
   determining a maturity level and usage frequency of the another application; and
   generating one or more configurations based on the IT resources for the application to be deployed, the one or more configurations generated according to the maturity level and the usage frequency.

13. The non-transitory computer readable medium of claim 8, wherein the instructions further comprise storing a relationship between one or more application maturity levels, one or more usage frequencies, and one or more timeouts;
   generating one or more configurations based on the IT resources for the application to be resized, by:
      a calculation of a time required for deployment of each of the one or more configurations; and
      a determination of the timeout for the one or more configurations based on the application maturity level of the application to be resized, the usage frequency of the application to be resized, and the relationship between the one or more application maturity levels, the one or more usage frequencies, and the one or more timeouts;
      wherein for the time required for deployment exceeding the determined timeout, providing an indication of the timeout being exceeded; and
      allocating the IT resources specified for the one or more configurations for the application to be resized when the time required for deployment does not exceed the determined timeout.

\* \* \* \* \*